US008840759B2

(12) United States Patent
Benz et al.

(10) Patent No.: US 8,840,759 B2
(45) Date of Patent: Sep. 23, 2014

(54) METHOD OF USING ALDEHYDE-FUNCTIONALIZED POLYMERS TO INCREASE PAPERMACHINE PERFORMANCE AND ENHANCE SIZING

(71) Applicant: Nalco Company, Naperville, IL (US)

(72) Inventors: Bradley J. Benz, Parker, CO (US); William C. Johnson, Chicago, IL (US); Mei Liu, Plainfield, IL (US); Shawnee Wilson, Downers Grove, IL (US); Mark Grimm, Stanley, NC (US); Michael R. St. John, Chicago, IL (US)

(73) Assignee: Ecolab USA Inc., Naperville, IL (US)

( * ) Notice: Subject to any disclaimer, the term of this patent is extended or adjusted under 35 U.S.C. 154(b) by 0 days.

(21) Appl. No.: 13/802,052

(22) Filed: Mar. 13, 2013

(65) Prior Publication Data

US 2013/0192782 A1    Aug. 1, 2013

Related U.S. Application Data

(63) Continuation-in-part of application No. 12/938,017, filed on Nov. 2, 2010, now Pat. No. 8,709,207.

(51) Int. Cl.
*D21H 11/00* (2006.01)

(52) U.S. Cl.
USPC .......... 162/164.1; 162/158; 428/364

(58) Field of Classification Search
USPC .............. 162/164.1, 158; 428/364
See application file for complete search history.

(56) References Cited

U.S. PATENT DOCUMENTS

| | | | |
|---|---|---|---|
| 2,982,749 A | 5/1961 | Friedrich et al. |
| 3,284,393 A | 11/1966 | Vanderhoff et al. |
| 3,556,932 A | 1/1971 | Coscia et al. |
| 3,734,873 A | 5/1973 | Anderson et al. |
| 4,603,176 A | 7/1986 | Bjorkquist et al. |
| 4,605,702 A | 8/1986 | Guerro et al. |
| 4,657,946 A | 4/1987 | Rende et al. |
| 4,919,821 A | 4/1990 | Fong et al. |
| 4,929,655 A | 5/1990 | Takeda et al. |
| 5,006,590 A | 4/1991 | Takeda et al. |
| 5,147,908 A | 9/1992 | Floyd |
| 5,571,380 A | 11/1996 | Fallon et al. |
| 5,597,858 A | 1/1997 | Ramesh et al. |
| 5,597,859 A | 1/1997 | Hurlock et al. |
| 5,605,970 A | 2/1997 | Selvarajan |
| 5,654,198 A | 8/1997 | Carrier et al. |
| 5,674,362 A | 10/1997 | Underwood |
| 5,837,776 A | 11/1998 | Selvarajan et al. |
| 5,985,992 A | 11/1999 | Chen |
| 6,013,708 A | 1/2000 | Mallon et al. |
| 6,077,394 A | 6/2000 | Spence et al. |
| 6,083,348 A | 7/2000 | Auhorn et al. |
| 6,238,521 B1 | 5/2001 | Shing et al. |
| 6,315,866 B1 | 11/2001 | Sanchez |
| 6,426,383 B1 | 7/2002 | Fong et al. |
| 6,472,487 B2 | 10/2002 | Schroeder et al. |
| 6,491,790 B1 | 12/2002 | Proverb et al. |
| 6,610,209 B1 | 8/2003 | Sommese et al. |
| 6,743,335 B2 | 6/2004 | Proverb et al. |
| 7,034,087 B2 | 4/2006 | Hagiopol et al. |
| 7,119,148 B2 | 10/2006 | Hagiopol et al. |
| 7,455,751 B2 | 11/2008 | Ward et al. |
| 7,488,403 B2 | 2/2009 | Hagiopol et al. |
| 7,550,060 B2 | 6/2009 | Jacobson et al. |
| 7,641,766 B2 | 1/2010 | St. John et al. |
| 7,938,934 B2 | 5/2011 | Todorovic et al. |
| 2006/0142535 A1 | 6/2006 | Cyr et al. |
| 2008/0277084 A1 | 11/2008 | Denowski et al. |
| 2008/0308242 A1 | 12/2008 | Lu |
| 2009/0165978 A1 | 7/2009 | Hagiopol et al. |
| 2011/0146925 A1 | 6/2011 | Bode et al. |

FOREIGN PATENT DOCUMENTS

| | | |
|---|---|---|
| EP | 0151994 A2 | 8/1985 |
| EP | 183466 B1 | 8/1990 |
| EP | 183466 B2 | 8/1990 |
| EP | 657478 A2 | 6/1995 |
| EP | 657478 A3 | 6/1995 |
| EP | 630909 B1 | 10/1998 |

OTHER PUBLICATIONS

Farley, C.E., "Giyoxalated Polyacrylamide Resin," Wet-Strength Resins and Their Application, TAPPI Press: Atlanta, GA, 1994, Chapter 3, pp. 45-61.
Hunkeler, et al., "Mechanism, Kinetics and Modeling of the Inverse-Microsuspension Homopolymerization of Acrylamide," Polymer, vol. 30, No. 1, 1989, pp. 127-142.
Hunkeler et al., "Mechanism, Kinetics and Modeling of Inverse-Microsuspension Polymerization: 2. Copolymerization of Acrylamide with Quaternary Ammonium Cationic Monomers," Polymer, vol. 32, No. 14, 1991, pp. 2626-2640.
St. John, M.R., "Ondeo-Nalco Technical Exchange," dated Jun. 27, 2002 (5 pages).
Parez product analysis (1999).
Hercobond product analysis (2002).

*Primary Examiner* — Mark Halpern
(74) *Attorney, Agent, or Firm* — Brinks Gilson & Lione

(57) ABSTRACT

Disclosed herein are compositions and methods to increase paper machine performance and enhance sizing. The compositions include a sizing agent, an emulsifier, and an aqueous component. The emulsifier may be an aldehyde-functionalized polymer.

29 Claims, 10 Drawing Sheets

METHOD OF USING ALDEHYDE-FUNCTIONALIZED POLYMERS TO INCREASE PAPERMACHINE PERFORMANCE AND ENHANCE SIZING

CROSS REFERENCE TO RELATED APPLICATION

This is a continuation-in-part of U.S. application Ser. No. 12/938,017, filed Nov. 2, 2010, which is hereby incorporated by reference.

TECHNICAL FIELD

Disclosed herein are compositions and methods for improving paper and paperboard production. More specifically, disclosed are compositions and methods for using aldehyde-functionalized polymers as emulsion stabilizers for sizing emulsions.

BACKGROUND

Sizing agents are used in the papermaking process to increase wood fiber's resistance to liquid penetration. The resistance to the absorption of liquids is desired when the paper product is purposefully wetted during a converting process (printing or laminating) or accidentally wetted (packaging containers or newspapers). Alkenyl succinic anhydride (ASA) is an internal sizing agent, which is commonly used to treat fibers in the papermaking process, making them more hydrophobic. Internal sizing refers to the treatment of the wood fibers prior to forming a wet web. ASA is a water insoluble oil that is essentially nonionic in nature. Therefore, ASA must be emulsified before it is added to the papermaking process. Emulsification of ASA produces an oil in water emulsion and also cationizes the ASA emulsion droplets. Cationizing the ASA droplets helps to promote emulsion stability and aids in ASA retention. Cationic emulsifiers such as derivitized starches and synthetic acrylamide-based polymers are currently used as emulsifiers for ASA.

Despite available technologies, there exists a need to improve sizing performance and machine efficiency in paper production processes. There also exists an ongoing industrial need in the papermaking industry to develop sizing formulations and methods that improve sizing of paper and paperboard and also provide other enhancements to papermaking process to reduce the need for multiple chemistries.

SUMMARY

In one aspect, disclosed herein is a sizing emulsion including a) a sizing agent, b) an emulsifier, and c) an aqueous component.

In certain embodiments, the sizing agent is selected from the group consisting of an alkyl ketene dimer ("AKD") and an alkenyl succinic anhydride (ASA).

In certain embodiments, the emulsifier is selected from the group consisting of: glyoxalated poly(DADMAC)/AcAm polymer having a 5 mole % DADMAC monomer content; glyoxalated poly(DADMAC)/AcAm polymer having a 5 mole % DADMAC monomer content and further comprising $MgSO_4.7H_2O$; glyoxalated poly(DADMAC)/AcAm polymer having a 12 mole % DADMAC monomer content; and glyoxalated poly(DADMAC)/AcAm polymer having a 12 mole % DADMAC monomer content and further comprising $MgSO_4.7H_2O$. In certain embodiments, the emulsifier is glyoxalated poly(DADMAC)/AcAm polymer having a 5 mole % DADMAC monomer content. In certain embodiments, the emulsifier is glyoxalated poly(DADMAC)/AcAm polymer having a 5 mole % DADMAC monomer content and further comprising $MgSO_4.7H_2O$. In certain embodiments, the emulsifier is glyoxalated poly(DADMAC)/AcAm polymer having a 12 mole % DADMAC monomer content. In certain embodiments, the emulsifier is glyoxalated poly(DADMAC)/AcAm polymer having a 12 mole % DADMAC monomer content and further comprising $MgSO_4.7H_2O$.

In certain embodiments, the emulsifier is glyoxalated poly(DADMAC)/AcAm polymer having a weight average molecular weight of at least about 300 kiloDaltons (kD). In certain embodiments, the emulsifier is glyoxalated poly(DADMAC)/AcAm polymer having a 5 mole % DADMAC monomer content, said polymer having a weight average molecular weight ranging from 1000 kiloDaltons (kD) to about 2500 kD. In certain embodiments, the emulsifier is glyoxalated poly(DADMAC)/AcAm polymer having a 5 mole % DADMAC monomer content and further comprising $MgSO_4.7H_2O$, said polymer having a weight average molecular weight ranging from 600 kiloDaltons (kD) to 1500 kD. In certain embodiments, the emulsifier is glyoxalated poly(DADMAC)/AcAm polymer having a 12 mole % DADMAC monomer content, said polymer having a weight average molecular weight ranging from 500 kiloDaltons (kD) to 2,000 kD. In certain embodiments, the emulsifier is glyoxalated poly(DADMAC)/AcAm polymer having a 12 mole % DADMAC monomer content and further comprising $MgSO_4.7H_2O$, said polymer having a weight average molecular weight ranging from 500 kiloDaltons (kD) to 2,000 kD.

In certain embodiments, the sizing emulsion has a median particle size of less than or equal to 2.5 microns, less than or equal to 2.0 microns, less than or equal to 1.5 microns, less than or equal to 1.4 microns, or less than or equal to 1.3 microns. In certain embodiments, the sizing emulsion has a median particle size of less than or equal to 1.5 microns after 0 minutes of aging, less than or equal to 1.5 microns after 30 minutes of aging, and less than or equal to 1.5 microns after 60 minutes of aging.

In certain embodiments, the ratio of emulsifier to sizing agent ranges from 0.6:1.0 to 1.3:1.0.

In another aspect, disclosed herein is a method of enhancing sizing, the method comprising adding an effective amount of a sizing emulsion to a paper machine in a papermaking process, wherein the sizing emulsion includes a) a sizing agent, b) an emulsifier, and c) an aqueous component.

In certain embodiments, the sizing agent is selected from the group consisting of an alkyl ketene dimer ("AKD") and an alkenyl succinic anhydride (ASA).

In certain embodiments, the emulsifier is selected from the group consisting of: glyoxalated poly(DADMAC)/AcAm polymer having a 5 mole % DADMAC monomer content; glyoxalated poly(DADMAC)/AcAm polymer having a 5 mole % DADMAC monomer content and further comprising $MgSO_4.7H_2O$; glyoxalated poly(DADMAC)/AcAm polymer having a 12 mole % DADMAC monomer content; and glyoxalated poly(DADMAC)/AcAm polymer having a 12 mole % DADMAC monomer content and further comprising $MgSO_4.7H_2O$. In certain embodiments, the emulsifier is glyoxalated poly(DADMAC)/AcAm polymer having a 5 mole % DADMAC monomer content. In certain embodiments, the emulsifier is glyoxalated poly(DADMAC)/AcAm polymer having a 5 mole % DADMAC monomer content and further comprising $MgSO_4.7H_2O$. In certain embodiments, the emulsifier is glyoxalated poly(DADMAC)/AcAm polymer having a 12 mole % DADMAC monomer content. In certain embodiments, the emulsifier is glyoxalated poly(DAD-MAC)/AcAm polymer having a 12 mole % DADMAC monomer content and further comprising $MgSO_4.7H_2O$.

In certain embodiments, the sizing emulsion has a median particle size of less than or equal to 2.5 microns, less than or equal to 2.0 microns, less than or equal to 1.5 microns, less than or equal to 1.4 microns, or less than or equal to 1.3 microns. In certain embodiments, the sizing emulsion has a median particle size of less than or equal to 1.5 microns after 0 minutes of aging, less than or equal to 1.5 microns after 30 minutes of aging, and less than or equal to 1.5 microns after 60 minutes of aging.

In certain embodiments, the ratio of emulsifier to sizing agent ranges from 0.6:1.0 to 1.3:1.0, based on volume.

In certain embodiments, the sizing emulsion is prepared in a high shear homogenizer emulsification unit. The volume ratio of emulsifier to ASA may range from 0.6:1.0 to 1.0:1.0. The percentage of the emulsifier in the turbine loop may range from 0.25% to 1.2% based on solids. The resulting sizing emulsion may have a median particle size ($D_{50}$) of 1.4 micron or less.

In certain embodiments, the sizing emulsion is prepared in a high pressure turbine emulsification unit. The volume ratio of emulsifier to ASA may range from 0.6:1.0 to 1.3:1.0. The percentage of the emulsifier in the turbine loop may range from 0.5% to 1.8% based on solids. The resulting sizing emulsion may have a median particle size ($D_{50}$) of 2.3 micron or less.

In certain embodiments, the sizing emulsion is diluted with a secondary carrier solution prior or simultaneously to entering a headbox of the paper machine. The secondary carrier solution may be an aqueous solution comprising an emulsifier. The emulsifier may be selected from the group consisting of: glyoxalated poly(DADMAC)/AcAm polymer having a 5 mole % DADMAC monomer content; glyoxalated poly(DADMAC)/AcAm polymer having a 5 mole % DADMAC monomer content and further comprising $MgSO_4.7H_2O$; glyoxalated poly(DADMAC)/AcAm polymer having a 12 mole % DADMAC monomer content; and glyoxalated poly(DADMAC)/AcAm polymer having a 12 mole % DADMAC monomer content and further comprising $MgSO_4.7H_2O$. In certain embodiments, the secondary carrier solution includes about 2 weight % to about 10 weight % of the emulsifier. In certain embodiments, the secondary carrier solution is an aqueous solution free of emulsifiers. In certain embodiments, the ratio of secondary carrier solution added to the sizing emulsion ranges from 2:1 to 20:1.

DETAILED DESCRIPTION

Figure 1:
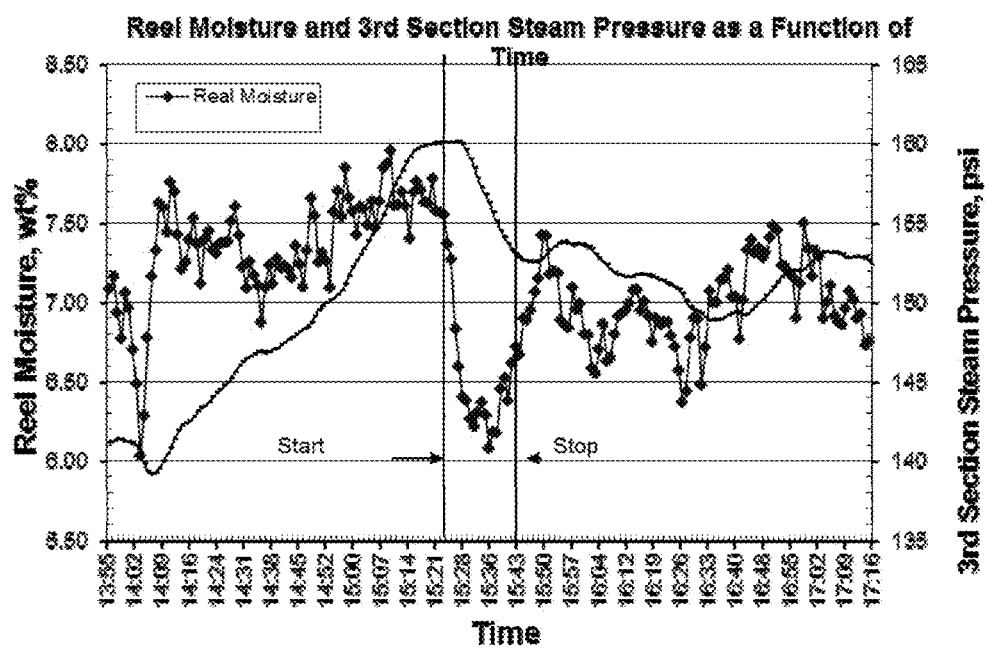
FIG. 1 is a graphical representation of the effect of an embodiment of the invention on reel moisture and steam pressure as a function of time.

Disclosed herein are sizing emulsions comprising at least one sizing agent, at least one emulsifier, and at least one aqueous component. It has been discovered unexpectedly that when one or more aldehyde-functionalized polymers are used as emulsifiers in the sizing emulsions, dramatic increases in papermachine dewatering and increases in paper production are achieved. Additionally, significant increases in internal sizing are achieved using the disclosed aldehyde-functionalized polymers when compared with equal amounts of polymer stabilizers consisting of starch or low to medium molecular weight cationic acrylamide polymers (i.e., sizing emulsion stabilizers currently used in the papermaking industry).

Also disclosed herein are methods of preparing sizing emulsions. The methods provide sizing emulsions exhibiting superior sizing performance compared to conventional sizing compositions and methods.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The following definitions are intended to be clarifying and are not intended to be limiting.

"Acrylamide monomer" means a monomer of formula

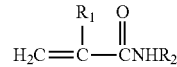

wherein $R_1$ is H or $C_1$-$C_4$ alkyl and $R_2$ is H, $C_1$-$C_4$ alkyl, aryl, or arylalkyl. Preferred acrylamide monomers are acrylamide and methacrylamide. Acrylamide is more preferred.

"Aldehyde" means a compound containing one or more aldehyde (—CHO) groups or a group capable of forming a reactive aldehyde group, where the aldehyde groups are capable of reacting with the aldehyde-reactive groups (e.g., amino or amido groups) of a polymer as described herein.

Representative aldehydes include formaldehyde, paraformaldehyde, glutaraldehyde, glyoxal, the like, and any other suitable mono-functional or poly-functional aldehyde. Glyoxal is preferred.

"Aldehyde-functionalized" means the reaction product of a precursor polymer and an aldehyde, where aldehyde-reactive group(s) of the precursor polymer has reacted with terminal carbonyl group(s) of the aldehyde(s).

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Amido group" means a group of formula —C(O)NHY$_1$ where Y$_1$ is selected from H, alkyl, aryl, and arylalkyl.

"Amino group" means a group of formula —NHY$_2$ where Y$_2$ is selected from H, alkyl, aryl, and arylalkyl.

"Amphoteric" means a polymer derived from both cationic monomers and anionic monomers, and, possibly, other nonionic monomer(s). Representative amphoteric polymers include copolymers composed of acrylic acid and DMAE-A.MCQ, terpolymers composed of acrylic acid, DADMAC and acrylamide, and the like.

"Aryl" means an aromatic monocyclic or multicyclic ring system of about 6 to about 10 carbon atoms. The aryl is optionally substituted with one or more $C_1$ to $C_{20}$ alkyl, alkoxy, or haloalkyl groups. Representative aryl groups include phenyl or naphthyl, or substituted phenyl or substituted naphthyl.

"Arylalkyl" means an aryl-alkylene-group where aryl and alkylene are defined herein. Representative arylalkyl groups include benzyl, phenylethyl, phenylpropyl, 1-naphthylmethyl, and the like. Benzyl is preferred.

"Cobb value" of a paper is a measure of the paper's ability to absorb water. Generally, the Cobb method is carried out such that an area of 100 cm$^2$ of a paper specimen during 60 seconds is subjected to influence from water, whereafter excess water is removed in a prescribed manner. Starting out from the weight of the paper before and after the exposure, the weight of the absorbed water is determined, which gives the Cobb value. A high Cobb value means that the water absorption ability is high and a low Cobb value that the water absorption ability is low.

"Diallyl-N,N-disubstituted ammonium halide monomer" means a monomer of the following formula.

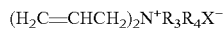

wherein R$_3$ and R$_4$ are independently C$_1$ to C$_{20}$ alkyl, aryl, or arylalkyl and X is an anionic counterion. Representative anionic counterions include halogen, sulfate, nitrate, phosphate, and the like. A preferred anionic counterion is halide. Chloride is preferred. A preferred diallyl-N,N-disubstituted ammonium halide monomer is diallyldimethylammonium chloride.

"Dispersion polymer" polymer means a water-soluble polymer dispersed in an aqueous continuous phase containing one or more organic or inorganic salts and/or one or more aqueous polymers. Representative examples of dispersion polymerization of water-soluble polymers in an aqueous continuous phase can be found in U.S. Pat. Nos. 5,605,970; 5,837,776; 5,985,992; 4,929,655; 5,006,590; 5,597,859; and 5,597,858 and in European Patent Nos. 183,466; 657,478; and 630,909.

"Emulsion" may refer to a liquid mixture in which a dispersed phase liquid, which is otherwise immiscible within a continuous phase liquid, is effectively distributed throughout the continuous phase liquid by means of some chemical and/or process.

"Emulsion polymer" and "latex polymer" mean a polymer emulsion comprising an aldehyde-functionalized polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, Hunkeler, et al., "*Mechanism, Kinetics and Modeling of the Inverse-Microsuspension Homopolymerization of Acrylamide,*" *Polymer*, vol. 30(1), pp 127-42 (1989); and Hunkeler et al., "*Mechanism, Kinetics and Modeling of Inverse-Microsuspension Polymerization:* 2. *Copolymerization of Acrylamide with Quaternary Ammonium Cationic Monomers,*" *Polymer*, vol. 32(14), pp 2626-40 (1991).

"Monomer" means a polymerizable allylic, vinylic, or acrylic compound. The monomer may be anionic, cationic, nonionic, or zwitterionic. Vinyl monomers are preferred, and acrylic monomers are more preferred.

"Papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, the like, any combination of the foregoing pulps. The steps of forming the papermaking furnish, draining and drying may be carried out in any manner generally known to those skilled in the art. In addition to the sizing emulsions herein described, other papermaking additives may be utilized as adjuncts with the polymer treatment of this invention, though it must be emphasized that no adjunct is required for effective activity. Such papermaking additives include, for example, retention aids (e.g., microparticles, flocculants, polymeric and inorganic coagulants, etc.), wet and dry strength additives (e.g., cationic starches, polyamidoamine epichlorohydrin-based polymers), the like, and combinations of the foregoing.

"Sizing" may refer to a papermaking process for reducing the hydrophilic nature of cellulose in paper to increase its resistance to penetration by printing or writing ink.

"Sizing mixture" or "sizing emulsion" may refer to an emulsion or dispersion used for sizing.

"Wet-end" may refer to that portion of a papermaking process involving an approach system, a sheet forming section and/or a pressing section.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. SIZING EMULSIONS

Sizing emulsions disclosed herein, also referred to as "sizing mixtures," or "emulsified product," include at least one sizing agent, at least one emulsifier, and at least one aqueous component.

In certain embodiments, the ratio of sizing agent to emulsifier (sizing agent:emulsifier) ranges from 1:1 to 20:1, about 2:1 to about 15:1, or about 2.5:1 to about 10:1. Alternatively, in certain embodiments, the ratio may be expressed as emulsifier to sizing agent (emulsifier:sizing agent), in which case the ratio may range from 0.05:1 to 1:1, about 0.07:1 to about 0.5:1, or about 0.1:1 to about 0.4:1. In certain embodiments, the ratio of emulsifier to sizing agent (emulsifier:sizing agent) may be about 0.05:1.00, about 0.10:1.00, about 0.15:1.00, about 0.20:1.00, about 0.25:1.00, about 0.30:1.00, about 0.35:1.00, about 0.40:1.00, about 0.45:1.00, about 0.50:1.00, about 0.55:1.00, about 0.60:1.00, about 0.65:1.00, about 0.70:1.00, about 0.75:1.00, about 0.80:1.00, about 0.85:1.00, about 0.90:1.00, about 0.95:1.00, or about 1.00:1.00. Ratios are by weight of active ingredients.

In certain embodiments, the ratio of emulsifier to sizing agent (emulsifier:sizing agent), on a volume basis, may range from about 0.03:1 to about 1.5:1, about 0.05:1 to about 1.3:1, about 0.05:1 to about 1:1, about 0.07:1 to about 0.5:1, or about 0.1:1 to about 0.4:1. In certain embodiments, the ratio of emulsifier to sizing agent may range from 0.6:1.0 to 1.25:1.0, 0.6:1.0 to 1.0:1.0, 0.6:1.0 to 0.95:1.0, or 0.6:1.0 to 0.90:1.0, based on volume. In certain embodiments, the ratio of emulsifier to sizing agent (emulsifier:sizing agent), on a volume basis, may be about 0.05:1.00, about 0.10:1.00, about 0.15:1.00, about 0.20:1.00, about 0.25:1.00, about 0.30:1.00, about 0.35:1.00, about 0.40:1.00, about 0.45:1.00, about 0.50:1.00, about 0.55:1.00, about 0.60:1.00, about 0.65:1.00, about 0.70:1.00, about 0.75:1.00, about 0.80:1.00, about 0.85:1.00, about 0.90:1.00, about 0.95:1.00, about 1.00:1.00, about 1.05:1.00, about 1.10:1.00, about 1.15:1.00, about 1.20:1.00, about 1.25:1.00, about 1.30:1.00, about 1.35:1.00, about 1.40:1.00, about 1.45:1.00, or about 1.50:1.00. Ratios are by volume of active ingredients.

In certain embodiments, the sizing emulsions may have a sizing agent concentration of 0.01% to 40% by weight, and an emulsifier concentration of 0.001% to 16% by weight. In certain embodiments, the sizing emulsions may have a sizing agent concentration by weight of about 0.1%, about 0.2%, about 0.3%, about 0.4%, about 0.5%, about 0.6%, about 0.7%, about 0.8%, about 0.9%, or about 1.0%. In certain embodiments, the sizing emulsions may have a sizing agent concentration by weight of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40%.

In certain embodiments, the sizing emulsions may have an emulsifier concentration by weight of about 0.01%, about 0.02%, about 0.03%, about 0.04%, about 0.05%, about 0.06%, about 0.07%, about 0.08%, about 0.09%, or about 0.10%. In certain embodiments, the sizing emulsions may have a emulsifier concentration by weight of about 0.1%, about 0.2%, about 0.3%, about 0.4%, about 0.5%, about 0.6%, about 0.7%, about 0.8%, about 0.9%, or about 1.0%. In certain embodiments, the sizing emulsions may have an emulsifier concentration by weight of about 1%, about 2%, about 3%, about 4%, about 5%, about 6%, about 7%, about 8%, about 9%, about 10%, about 11%, about 12%, about 13%, about 14%, about 15%, or about 16%.

The sizing emulsions can be prepared with any particle size suitable for the intended use. Desired results normally refer to the average particle size and particle size distribution. The emulsion particle size may refer to the median diameter of a vol % distribution obtained with a Malvern Mastersizer laser diffraction instrument (available from Malvern Instruments, Ltd., Malvern, UK). The median is defined as the diameter where 50% of the particles are greater than this value and 50% are less than the value. The particle size of the emulsion can be controlled by the amount of energy and emulsifier added.

In certain embodiments, the sizing emulsions have a median particle size ($D_{50}$) ranging from 0.01 microns to 10 microns, or 0.5 microns to 3 microns. In certain embodiments, the sizing emulsions have a median particle size ($D_{50}$) of 0.5 micron, 0.6 micron, 0.7 micron, 0.8 micron, 0.9 micron, 1.0 micron, 1.1 micron, 1.2 micron, 1.3 micron, 1.4 micron, 1.5 micron, 1.6 micron, 1.7 micron, 1.8 micron, 1.9 micron, 2.0 micron, 2.1 micron, 2.2 micron, 2.3 micron, 2.4 micron, 2.5 micron, 2.6 micron, 2.7 micron, 2.8 micron, 2.9, micron, 3.0 micron, 3.1 micron, 3.2 micron, 3.3 micron, 3.4 micron, 3.5 micron, 3.6 micron, 3.7 micron, 3.8 micron, 3.9 micron, 4.0 micron, 4.1 micron, 4.2 micron, 4.3 micron, 4.4 micron, 4.5 micron, 4.6 micron, 4.7 micron, 4.8 micron, 4.9 micron, or 5.0 micron.

In certain embodiments, the sizing emulsions have a particle size of which 90% of the population is less than, the $D_{90}$ being 6.0 micron or less, 5.5 micron or less, 5.0 micron or less, 4.5 micron or less, 4.0 micron or less, 3.5 micron or less, 3.0 micron or less, 2.5 micron or less, 2.0 micron or less, 1.5 micron or less, 1.4 micron or less, 1.3 micron or less, 1.2 micron or less, 1.1 micron or less, 1.0 micron or less, 0.9 micron or less, or 0.8 micron or less.

In certain embodiments, the percentage of particles in the sizing emulsion with size above 2 micrometer is 80% or less, 70% or less, 60% or less, 50% or less, 40% or less, 30% or less, 20% or less, or 10% or less.

In certain embodiments, the sizing emulsion has a median particle size of less than or equal to 2.0 microns after 0 minutes of aging, less than or equal to 2.0 microns after 30 minutes of aging, and less than or equal to 2.0 microns after 60 minutes of aging. In certain embodiments, the sizing emulsion has a median particle size of less than or equal to 1.9 microns after 0 minutes of aging, less than or equal to 1.9 microns after 30 minutes of aging, and less than or equal to 1.9 microns after 60 minutes of aging. In certain embodiments, the sizing emulsion has a median particle size of less than or equal to 1.8 microns after 0 minutes of aging, less than or equal to 1.8 microns after 30 minutes of aging, and less than or equal to 1.8 microns after 60 minutes of aging. In certain embodiments, the sizing emulsion has a median particle size of less than or equal to 1.7 microns after 0 minutes of aging, less than or equal to 1.7 microns after 30 minutes of aging, and less than or equal to 1.7 microns after 60 minutes of aging. In certain embodiments, the sizing emulsion has a median particle size of less than or equal to 1.6 microns after 0 minutes of aging, less than or equal to 1.6 microns after 30 minutes of aging, and less than or equal to 1.6 microns after 60 minutes of aging. In certain embodiments, the sizing emulsion has a median particle size of less than or equal to 1.5 microns after 0 minutes of aging, less than or equal to 1.5 microns after 30 minutes of aging, and less than or equal to 1.5 microns after 60 minutes of aging. In certain embodiments, the sizing emulsion has a median particle size of less than or equal to 1.4 microns after 0 minutes of aging, less than or equal to 1.4 microns after 30 minutes of aging, and less than or equal to 1.4 microns after 60 minutes of aging. In certain embodiments, the sizing emulsion has a median particle size of less than or equal to 1.3 microns after 0 minutes of aging, less than or equal to 1.3 microns after 30 minutes of aging, and less than or equal to 1.3 microns after 60 minutes of aging. In certain embodiments, the sizing emulsion has a median particle size of less than or equal to 1.2 microns after 0 minutes of aging, less than or equal to 1.2 microns after 30 minutes of aging, and less than or equal to 1.2 microns after 60 minutes of aging.

In certain embodiments, large particle sizing emulsions can be provided that exhibit effective sizing properties. In certain embodiments, the sizing emulsions may have a median particle size ($D_{50}$) of 10 micron or greater, 25 micron or greater, 50 micron or greater, 75 micron or greater, 100 micron or greater, 125 micron or greater, 150 micron or greater, 175 micron or greater, 200 micron or greater, 225 micron or greater, 250 micron or greater, 275 micron or greater, 300 micron or greater, 325 micron or greater, or 350 micron or greater, yet provide a Cobb 60 value of 80 or less, 75 or less, 70 or less, 65 or less, 60 or less, 55 or less, 50 or less, 45 or less, 40 or less, 35 or less, 30 or less, 25 or less, 20 or less, 15 or less, or 10 or less.

The sizing emulsions disclosed herein can be prepared to provide any Cobb 60 value suitable for the intended use. The Cobb 60 value refers to the amount of water absorption of a treated article. As the Cobb 60 value decreases, sizing performance improves. In certain embodiments, the sizing emulsions when used in a papermaking process may provide articles with a Cobb 60 value of 80 or less, 75 or less, 70 or less, 65 or less, 60 or less, 55 or less, 50 or less, 45 or less, 40 or less, 35 or less, 30 or less, 25 or less, 20 or less, 15 or less, or 10 or less. In certain embodiments, the sizing emulsions when used in a papermaking process may provide articles with a Cobb 120 value of 80 or less, 75 or less, 70 or less, 65 or less, 60 or less, 55 or less, 50 or less, 45 or less, 40 or less, 35 or less, 30 or less, 25 or less, 20 or less, 15 or less, or 10 or less. In certain embodiments, the sizing emulsions when used in a papermaking process may provide articles with a Cobb 30-minute value of 120 or less, 115 or less, 110 or less, 105 or less, 100 or less, 95 or less, 90 or less, 85 or less, 80 or less, 75 or less, 70 or less, 65 or less, 60 or less, 55 or less, 50 or less, 45 or less, 40 or less, 35 or less, 30 or less, 25 or less, 20 or less, 15 or less, or 10 or less.

The sizing emulsion disclosed herein can be prepared to provide a boiling boat test value ranging from 600-1800s (10-30 min).

a) Sizing Agents

The sizing emulsions disclosed herein include at least one sizing agent. Representative sizing agents include rosin size and water-insoluble hydrophobic cellulose-sizing agents, such as alkyl ketene dimer ("AKD"), alkenyl succinic anhydride (ASA), and mixtures thereof.

In certain embodiments, AKD and rosin sizing agents are used as dispersions (e.g., solid suspended in a liquid medium) rather than an emulsion. Such dispersions are sometimes used in circumstances where the melting point for certain AKDs and rosin sizing agents are lower than the use temperature. The dispersions, for example, may be made by melting and emulsifying the AKD or rosin sizing agent, allowing it to cool and solidify, and dispersing in a liquid solvent. Thus, in such embodiments, when the sizing agent is a solid at room temperature converting the solid to a liquid is typically necessary to form the emulsion.

In certain embodiments, the sizing agent is alkenyl succinic anhydride (ASA).

b) Emulsifiers

The sizing emulsions disclosed herein include at least one emulsifier. The emulsifier may include one or more aldehyde-functionalized polymers. The aldehyde-functionalized polymers may have various architectures including linear, branched, star, block, graft, dendrimer, the like, and any other suitable architecture. The polymers may include repeating units derived from one or more monomeric species. The monomeric species may be present in any amount and in any combination in the polymers.

The aldehyde-functionalized polymers may have a weight average molecular weight ranging from 100 kiloDaltons (kD) to 10,000 kD, 200 kD to 5,000 kD, 300 kD to 3,000 kD, or 500 kD to 2,000 kD. In certain embodiments, the aldehyde-functionalized polymer have a molecular weight of about 100 kD, about 200 kD, about 300 kD, about 400 kD, about 500 kD, about 600 kD, about 700 kD, about 800 kD, about 900 kD, about 1,000 kD, about 1,100 kD, about 1,200 kD, about 1,300 kD, about 1,400 kD, about 1,500 kD, about 1,600 kD, about 1,700 kD, about 1,800 kD, about 1,900 kD, about 2,000 kD, about 2,100 kD, about 2,200 kD, about 2,300 kD, about 2,400 kD, about 2,500 kD, about 2,600 kD, about 2,700 kD, about 2,800 kD, about 2,900 kD, or about 3,000 kD.

The aldehyde-functionalized polymers may have a Brookfield viscosity, measured in centipoise (cp), ranging from 5 cp to 30 cp, or 10 cp to 25 cp. In certain embodiments, the aldehyde-functionalized polymer have a Brookfield viscosity of about 5 cp, about 6 cp, about 7 cp, about 8 cp, about 9 cp, about 10 cp, about 11 cp, about 12 cp, about 13 cp, about 14 cp, about 15 cp, about 16 cp, about 17 cp, about 18 cp, about 19 cp, about 20 cp, about 21 cp, about 22 cp, about 23 cp, about 24 cp, about 25 cp, about 26 cp, about 27 cp, about 28 cp, about 29 cp, or about 30 cp.

In certain embodiments, the aldehyde-functionalized polymer is a copolymer comprising about 1 to about 99 mole percent acrylamide monomers and about 95 mole percent to about 1 mole percent of one or more cationic, anionic, nonionic, or zwitterionic monomers, or a mixture thereof. Copolymers prepared from nonionic aldehyde-reactive monomers and cationic monomers preferably have a cationic charge of about 1 to about 50 mole percent, more preferably from about 1 to about 30 mole percent. Copolymers prepared from nonionic aldehyde-reactive monomers and anionic monomers preferably have an anionic charge of about 1 to about 50 mole percent, more preferably from about 1 to about 30 mole percent. Zwitterionic polymers preferably comprise 1 to about 95 mole percent, preferably 1 to about 50 mole percent zwitterionic monomers.

In certain embodiments, the aldehyde-functionalized polymers are amphoteric polymers that preferably have an overall positive charge. Preferred amphoteric polymers are composed of up to about 40 mole percent cationic monomers and up to about 20 mole percent anionic monomers with the remaining monomers preferably being aldehyde-reactive monomers. More preferred amphoteric polymers comprise about 5 to about 10 mole percent cationic monomers and about 0.5 to about 4 mole percent anionic monomers with the remaining monomers preferably being aldehyde-reactive monomers.

Representative non-ionic, water-soluble monomers for inclusion in the aldehyde-functionalized polymers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and the like.

Representative anionic monomers for inclusion in the aldehyde-functionalized polymers include acrylic acid, and its salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, itaconic anhydride, and the like.

Representative cationic monomers or mer units for inclusion in the aldehyde-functionalized polymers include monoallyl amine, diallyl amine, vinyl amine, dialkylaminoalkyl acrylates and methacrylates and their quaternary or acid salts, including, but not limited to, dimethylaminoethyl acrylate methyl chloride quaternary salt (DMAEA•MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC). Alkyl groups are generally $C_1$ to $C_4$ alkyl.

Representative zwitterionic monomers for inclusion in the aldehyde-functionalized polymers include those that are a polymerizable molecule containing cationic and anionic (charged) functionality in equal proportions, so that the molecule is net neutral overall. Specific representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio] methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl)ammonium betaine, and the like.

In certain embodiments, the disclosed aldehyde-functionalized polymer compositions comprise from about 10 to about 90 mole percent aldehyde remaining unreacted. In certain embodiments, the amount of aldehyde that remains unreacted may range (all ranges in mole percent) from about 10 to about 80, or from about 10 to about 70, or from about 10 to about 60 mole percent. In other embodiments, the amount of aldehyde that remains unreacted is greater than about 60 mole percent.

In certain embodiments, the aldehyde-functionalized polymer is an aldehyde-functionalized poly(diallyldimethylammonium chloride)-acrylamide polymer, also referred to as an aldehyde-functionalized poly(DADMAC)-acrylamide polymer or aldehyde-functionalized poly(DADMAC)/AcAm polymer. In certain embodiments, the aldehyde-functionalized polymer is a glyoxalated poly(DADMAC)-acrylamide polymer, also referred to as a GPAM polymer.

The GPAM polymer may be derived from a DADMAC-acrylamide backbone having any suitable mole % of DADMAC monomer. In certain embodiments, the GPAM polymer is derived from a DADMAC-acrylamide backbone having from 1 mole % to 50 mole % DADMAC monomer content, 2 mole % to 30 mole % DADMAC monomer content, 3 mole % to 25 mole % DADMAC monomer content, 4 mole % to 20 mole % DADMAC monomer content, 5 mole % to 15 mole % DADMAC monomer content, 6 mole % to 14 mole % DADMAC monomer content, 7 mole % to 13 mole % DADMAC monomer content, or 8 mole % to 12 mole % DADMAC monomer content. In certain embodiments, the GPAM polymer is derived from a DADMAC-acrylamide backbone having 1 mole % DADMAC monomer content, 2 mole % DADMAC monomer content, 3 mole % DADMAC monomer content, 4 mole % DADMAC monomer content, 5 mole % DADMAC monomer content, 6 mole % DADMAC monomer content, 7 mole % DADMAC monomer content, 8 mole % DADMAC monomer content, 9 mole % DADMAC monomer content, 10 mole % DADMAC monomer content, 11 mole % DADMAC monomer content, 12 mole % DADMAC monomer content, 13 mole % DADMAC monomer content, 14 mole % DADMAC monomer content, 15 mole % DADMAC monomer content, 16 mole % DADMAC monomer content, 17 mole % DADMAC monomer content, 18 mole % DADMAC monomer content, 19 mole % DADMAC monomer content, 20 mole % DADMAC monomer content, 21 mole % DADMAC monomer content, 22 mole % DADMAC monomer content, 23 mole % DADMAC monomer content, 24 mole % DADMAC monomer content, 25 mole % DADMAC monomer content, 26 mole % DADMAC monomer content, 27 mole % DADMAC monomer content, 28 mole % DADMAC monomer content, 29 mole % DADMAC monomer content, or 30 mole % DADMAC monomer content. In certain embodiments, the GPAM is an aldehyde-functionalized poly(DADMAC)/AcAm polymer having a 12 mole % DADMAC monomer content.

In certain embodiments, the emulsifiers disclosed herein are provided as neat compositions. In other embodiments, emulsifiers are provided as solutions having a percent actives. For example, the emulsifier may be provided as an aqueous solution of GPAM polymer (e.g., a 12% solution of GPAM).

i) Stability Additives

In certain embodiments, the emulsifiers disclosed herein include one or more stability additives. The stability additive may be an inorganic salt, an organic additive, or a combination thereof. The stability additive may increase the shelf life of the emulsifier composition by slowing the rate of product gelling. The presence of the stability additive may also improve emulsion stability. This improved emulsion stability may improve on-machine sizing performance.

Suitable salts for inclusion with the emulsifying polymers include, but are not limited to, alkali metal salts, alkaline earth metal salts, transition metal salts, hydrates thereof, the like, and any combination of the foregoing. Specific examples of inorganic salts include $MgSO_4$ and its hydrated forms (e.g., $MgSO_4.7H_2O$), $MgCl_2$ and its hydrated forms (e.g., $MgCl_2.6H_2O$), $Mg(acetate)_2$ and its hydrated forms (e.g., $Mg(OAc)_2.4H_2O$), $ZnSO_4$ and its hydrated forms (e.g., $ZnSO_4.7H_2O$), $Na_2SO_4$, $NaCl$, $(NH_4)_2SO_4$, and any combination of the foregoing. In certain embodiments, the salt is selected from the group consisting of magnesium sulfate, magnesium sulfate monohydrate, magnesium sulfate tetrahydrate, magnesium sulfate pentahydrate, magnesium sulfate hexahydrate, and magnesium sulfate heptahydrate.

Suitable organic additives for inclusion with emulsifying polymers include, but are not limited to, diols, triols, polyols, saccharides, the like, and any combination of the foregoing. Specific examples of organic additives include glycerol, ethyleneglycol, urea, and any combination of the foregoing.

The stabilizing additive may be present in any suitable amount. In certain embodiments, the stabilizing additive is incorporated into the emulsifier composition at concentrations from about 0.5 weight % to about 15 weight % based on total weight of the composition. In certain embodiments, the stabilizing additive is present in the polymer composition at 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt % based on total weight of the composition.

In a preferred embodiment, the emulsifier is a GPAM polymer composition further comprising one or more salts. Suitable salts for inclusion with the GPAM polymers include, but are not limited to, magnesium sulfate, magnesium sulfate monohydrate, magnesium sulfate tetrahydrate, magnesium sulfate pentahydrate, magnesium sulfate hexahydrate, and magnesium sulfate heptahydrate. In certain embodiments, the GPAM is an aldehyde-functionalized poly(DADMAC)/AcAm polymer having a 5 mole % DADMAC monomer content, said polymer composition further comprising $MgSO_4.7H_2O$. In certain embodiments, the GPAM is an aldehyde-functionalized poly(DADMAC)/AcAm polymer having a 12 mole % DADMAC monomer content, said polymer composition further comprising $MgSO_4.7H_2O$, preferably at concentrations from about 0.5 weight % to about 10 weight % based on total weight of the composition. In certain embodiments, the $MgSO_4.7H_2O$ is present in the composition at 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt % based on total weight of the composition.

ii) Method of Making Emulsifiers

The emulsifiers disclosed herein may be prepared by any suitable method. In certain embodiments, the aldehyde-functionalized polymers disclosed herein are prepared by reacting a precursor or preformed polymer comprising one or more aldehyde-reactive moieties (e.g., any combination of amines, amides, and hydroxyls) with one or more aldehydes. Preferred polymers include those having amino or amido groups as the aldehyde-reactive moieties. These precursor or preformed polymers may be derived from any suitable source and synthesized using any suitable method. For example, the aldehyde-reactive polymers may be formed via emulsion, dispersion, or solution polymerization and may contain non-ionic, cationic, anionic, and zwitterionic monomeric species with the polymer. Moreover, these monomeric species may be present in any amount and in any combination in the polymer.

In certain embodiments, polyamines are prepared by modification of a pre-formed polyamide, for example by hydrolysis of acrylamide-vinylformamide copolymer using acid or base as described in U.S. Pat. Nos. 6,610,209 and 6,426,383.

In certain embodiments, polyaminoamides may be prepared by direct amidation of polyalkyl carboxylic acids and transamidation of copolymers containing carboxylic acid and (meth)acrylamide units as described in U.S. Pat. No. 4,919,821.

In certain embodiments, the preformed polymers are prepared as an emulsion or latex polymer. For example, the aqueous phase is prepared by mixing together in water one or more water-soluble monomers, and any polymerization additives such as inorganic salts, chelants, pH buffers, and the like. The oil phase is prepared by mixing together an inert hydrocarbon liquid with one or more oil soluble surfactants. The surfactant mixture should have a low hydrophilic-lypophilic balance (HLB), to ensure the formation of an oil continuous emulsion. Appropriate surfactants for water-in-oil emulsion polymerizations, which are commercially available, are compiled in the North American Edition of McCutcheon's Emulsifiers & Detergents. The oil phase may need to be heated to ensure the formation of a homogeneous oil solution. The oil phase is then charged into a reactor equipped with a mixer, a thermocouple, a nitrogen purge tube, and a condenser. The aqueous phase is added to the reactor containing the oil phase with vigorous stirring to form an emulsion.

The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added. Preferably the resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

In certain embodiments, the preformed polymer used in the invention may be a dispersion polymer. In a typical procedure for preparing a dispersion polymer, an aqueous solution containing one or more inorganic or organic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a free radical initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally in the range of about 100 to about 10,000 centipoise, measured at low shear.

In certain embodiments, the preformed or precursor polymers used in the invention are solution polymers. In a typical procedure for preparing solution polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Solution polymer viscosities vary widely, and are dependent upon the concentration and molecular weight and structure of the active polymer component.

Polymerization reactions are typically initiated by any means which results in generation of a suitable free-radical. Thermally derived radicals, in which the radical species results from thermal, homolytic dissociation of an azo, peroxide, hydroperoxide and perester compound are preferred. Preferred initiators are azo compounds including 2,2'-azobis (2-amidinopropane) dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), the like, and combinations thereof. More preferred initiators include peroxides, such as ammonium persulfate, sodium persulfate, the like, and combinations thereof.

In certain embodiments, the polymerization processes can be carried out as a batch process or in steps. In a representative batch process, all of the monomers are reacted together, whereas in a step or semi-batch process, a portion of the monomer is withheld from the main reaction and added over time to affect the compositional drift of the copolymer or the formation of the dispersion particles. In a continuous process embodiment, all of the monomer is added over time and affects the compositional drift differently.

The polymerization and/or post polymerization reaction conditions are selected such that the resulting polymer comprising aldehyde-reactive moieties (i.e., the preformed or precursor polymer) has a molecular weight of at least about 1,000 g/mole, preferably about 2,000 to about 10,000,000 g/mole. This polymer is then functionalized by reaction with one or more aldehydes. Suitable aldehydes include any compound containing one or more aldehyde (—CHO) functional groups (i.e., mono-functional or poly-functional aldehydes) and having sufficient reactivity to react with the aldeyhyde-reactive moieties (e.g., amino or amido groups) of the polymer. Representative aldehydes include formaldehyde, paraformaldehyde, glutaraldehyde, glyoxal, the like, and any other suitable reactive aldehyde.

In an embodiment, the aldehyde-functionalized polymer is prepared by reacting the polyamide or polyamine with one or more aldehydes at a pH between 4 to 12. The total concentration of polymer backbone (i.e., preformed or precursor polymer having aldehyde-reactive moieties) plus aldehyde may be between about 2 to about 35 weight percent. Generally, an aqueous solution of the polymer backbone is prepared for better reaction rate control and increased product stability. The pH of the aqueous polymer backbone solution is increased to between about 4 to about 12. The reaction temperature is generally about 20° C. to about 80° C. preferably about 20° C. to about 40° C. An aqueous aldehyde solution is added to the aqueous polymer backbone solution with good mixing to prevent gel formation. The rate of viscosity increase is monitored using a Brookfield viscometer to follow the cross-linking reaction. A viscosity increase of 0.5 cps indicates an increase in polymer molecular weight and an increase in polymer precursor cross-linking.

Generally, the desired viscosity increase corresponds to a desired level of activity which generally reaches a maximum or a point of diminishing activity at a specific viscosity. The rate of reaction depends on the temperature, total concentration of polymer and aldehyde, the ratio of aldehyde to amide/amine functional groups, and pH. Higher rates of glyoxylation (in the case where glyoxal is used as the aldehyde) are expected when the temperature, total concentration of polymer and aldehyde, the ratio of aldehyde to amide/amine functional groups or pH is increased. The rate of reaction can be slowed down by decreasing the total concentration of polymer and aldehyde, temperature, the ratio of aldehyde to amide/amine functional groups or pH (to between about 2 to about 3.5). The amount of unreacted aldehyde at the end of the reaction increases as the ratio of aldehyde to amide/amine functional groups is increased.

In a preferred embodiment, the precursor polymer is prepared from a DADMAC and acrylamide copolymer. Monomers of DADMAC and acrylamide may be present in weight-to-weight ratios in the precursor polymer ranging from about 5/95 to about 95/5, respectively. This precursor copolymer may have a weight average molecular weight of about 17,000 g/mole and may be reacted, for example, with glyoxal. The amount of glyoxal can vary but is usually added to achieve a glyoxal to acrylamide mole ratio of 0.1 to 1.0. A preferred DADMAC/acrylamide weight-to-weight ratio is 10/90.

The reaction conditions are preferably selected such that the molar ratio of aldehyde to aldehyde-reactive moiety is from about 0.05 to about 1.5. This range of molar ratios may result in a wide range of the aldehyde-reactive moieties of the precursor polymer being functionalized. For example, from about 0.5 mole percent to greater than 40 mole percent of the aldehyde-reactive moieties may be functionalized. Moreover, depending on the particular combination of chosen aldehydes, from about 2 to about 40 percent or more of those reacted moieties may participate in cross-links through the multifunctional aldehyde. In certain embodiments, 15 mole percent, preferably at least about 20 mole percent of the amino or amido groups in the polymer react with the aldehyde to form an aldehyde-functionalized polymer.

In certain embodiments, the polymers are combined with a stabilizing additive, such as magnesium sulfate or a hydrate thereof. Addition of one or more stabilizing agents to the composition results in increased storage time or shelf life. In a preferred method for increasing storage time for the aldehyde-functionalized polymer compositions of the invention, one or more stabilizing agents are introduced into the reaction mixture while the precursor is undergoing aldehyde-functionalization or to the aldehyde-functionalized product. The added stabilizing agent(s) preferably increase the storage time as measured relative to a comparable non-stabilized aldehyde-functionalized polymer. A representative method for measuring stability includes determining the viscosity of the product until it rapidly increases to the point of gelling exhibited during an extended storage time relative to a comparable non-stabilized aldehyde-functionalized polymer.

In an embodiment, such a method of increasing storage time may include the steps of (i) preforming the polymer having one or more aldehyde-reactive moieties, (ii) adding the one or more reactive aldehydes to the preformed polymer, (iii) inducing reaction between the preformed polymer and the one or more reactive aldehydes to form the one or more aldehyde-functionalized polymers, and (iv) adding the one or more stabilizing agents step-wise, batch, semi-batch, continuous, or intermittent at any time and at any rate before, during, or after the foregoing steps.

In another embodiment, such a method may include (i) preforming a polymer having one or more aldehyde-reactive moieties, (ii) adding one or more reactive aldehydes to the preformed polymer to form a reaction mixture, (iii) adding the one or more stabilizing agents to the reaction mixture, and (iv) inducing reaction between the preformed polymer and the one or more reactive aldehydes to form the stabilized aldehyde-functionalized polymer composition.

In a further embodiment, such a method may include (i) preforming the polymer having one or more aldehyde-reactive moieties, (ii) adding the one or more reactive aldehydes to the preformed polymer, (iii) inducing reaction between the preformed polymer and the one or more reactive aldehydes to form the one or more aldehyde-functionalized polymers, and (iv) adding the one or more stabilizing agents to the aldehyde-functionalized polymers to form the stabilized aldehyde-functionalized polymer composition.

c) Aqueous Component

The sizing emulsions disclosed herein include at least one aqueous component. The aqueous component may be any suitable aqueous phase suitable for the intended use. In certain embodiments, the aqueous component is selected from the group consisting of deionized water, tap water, plant water, process waters for papermaking processes, and any combination thereof. In certain embodiments, the aqueous component is a starch solution, fresh water, purified process water from a mill, thin stock water, alum, clarified white water, white water, or any combination thereof. The aqueous component may include other constituents, and may have varying levels of hardness. The aqueous component, or a portion thereof, may be supplied from the emulsifier and/or the sizing agent components, as disclosed herein. For example, the emulsifier may be provided as an aqueous solution of an aldehyde-functionalized polymer.

d) Secondary Diluent

In certain embodiments, the sizing emulsions prepared with a sizing agent, an emulsifier, and an aqueous component can be further diluted with a secondary solution (a "secondary carrier solution"). Use of a secondary carrier solution (e.g., a glyoxalated polyacrylamide aqueous solution) to dilute the emulsified product may provide several advantages, including, but not limited to, increased paper machine production rates, lower steam demands on paper machines, increased paper dry strength, increased paper wet strength, increased resistance to humidity, improved ASA sizing response, and addressing market needs for humidity board.

The secondary carrier solution may be an aqueous solution comprising an aldehyde-functionalized polymer as disclosed herein, such as GPAM. Alternatively, the secondary carrier solution may be an aqueous solution free of emulsifiers. In certain embodiments, the secondary carrier solution is an as-received commercial grade aqueous solution of GPAM. In certain embodiments, the secondary carrier solution is a diluted aqueous GPAM solution, comprising about 2 weight % to about 10 weight % GPAM. The ratio of secondary carrier solution added to the sizing emulsion (e.g., GPAM emulsified ASA) may range from 2:1 to 20:1.

Optionally, additional aldehyde-functionalized polymer (e.g., GPAM) can be added either at the makedown unit with the secondary carrier solution or added after the secondary solution has diluted the emulsified product. In certain embodiments, additional GPAM may be added at the point of addition of the sizing emulsion into the papermaking process. The additional GPAM may be fed into secondary carrier water with a ratio ranging from 1:1 to 100:1 (Water:GPAM). The ratio of dilution may depend on the dosage of GPAM and the final concentration of the emulsified product (e.g., ASA: GPAM emulsion).

The secondary diluent can be introduced at any point directly after the emulsion make down up to the injection point of the emulsion to the paper stock. It is preferred that the secondary diluent be co-mixed with the emulsion at the paper stock injection point.

3. METHODS OF PREPARING SIZING EMULSIONS

Stabilized sizing emulsions can be generally prepared using the procedures taught in colloid science (e.g. S. E. Friberg & S. Jones, "Emulsions" in the Encyclopedia of Chemical Technology, Vol. 9 ($4^{th}$ edition)). The general concept consists of imparting energy to a mixture of hydrophobic material (e.g., sizing agent) and water in the presence of emulsifier (in this case the cationic polymers described herein) which results in "small" droplets or particles of the hydrophobic material suspended in the aqueous phase. The mixing can be accomplished in any number of ways.

Mechanical means for emulsification, for example, can include high-speed agitators, mechanical homogenizers, or turbine pumps. Preferably, the equipment is capable of preparing an emulsion particle size in the range generally between about 0.01 and about 10 microns, preferably between about 0.5 to about 3 microns. Normally, the emulsion would be prepared from a mixture of the sizing agent, the emulsifier, and enough water to achieve the desired dilution. As noted in, for example U.S. Pat. Nos. 4,657,946 and 7,455,751, a surfactant of the sorts identified therein can be added to enhance the emulsification.

In certain embodiments, when emulsifying ASA with glyoxalated polyDADMAC-acrylamide (GPAM) polymers, certain emulsion quality specifications must be met in order to achieve optimal sizing in paper production processes. If these emulsion quality specifications are not met, all size response on the paper machine can be lost. Thus, to meet these emulsion specifications, in certain embodiments the emulsifier to sizing agent ratio (e.g., GPAM to ASA emulsification ratio) must be tightly controlled within a certain range. Additionally, in certain embodiments, the concentration of emulsifier (e.g., GPAM) in the turbine/homogenizer loop during emulsification must also be carefully controlled within a certain range.

It has been discovered that sizing agent (e.g., ASA) can be emulsified to a specific particle size distribution that optimizes sizing performance using particular high shear or high pressure emulsification processes and operating parameters, disclosed herein. In certain embodiments, a high pressure turbine pump emulsification unit may be used to prepare the sizing emulsion. In certain embodiments, a high shear homogenizer emulsification unit may be used to prepare the sizing emulsion.

In certain embodiments, when using a high pressure turbine pump emulsification unit to prepare the sizing emulsion, the emulsion should have a recirculation loop emulsifier (e.g., GPAM) solids concentration of 0.6% to 1.8%, or 0.9% to 1.0%. In certain embodiments, when using a high pressure turbine pump emulsification unit to prepare the sizing emulsion, the emulsion should have a recirculation loop emulsifier (e.g., GPAM) solids concentration of 0.6%, 0.7%, 0.8%, 0.9%, 1.0%, 1.1%, 1.2%, 1.3%, 1.4%, 1.5%, 1.6%, 1.7% or 1.8%.

In certain embodiments, when using a high shear homogenizer emulsification unit to prepare the sizing emulsion, the emulsion should have a recirculation loop emulsifier (e.g., GPAM) solids concentration of 0.25% to 1.2%, 0.25% to 0.9%, or 0.25% to 0.5%. In certain embodiments, when using a high shear homogenizer emulsification unit to prepare the sizing emulsion, the emulsion should have a recirculation loop emulsifier (e.g., GPAM) solids concentration of 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.00%, 1.05%, 1.10%, 1.15%, or 1.20%.

In certain embodiments, when using a high pressure turbine pump emulsification unit, the emulsifier to sizing agent ratio (e.g., GPAM to ASA emulsification ratio) should range from 0.65:1.0 to 1.3:1.0 on a solids ratio, or from 0.6:1.0 to 1.25:1.0 on a volume ratio. In certain embodiments, when using the high pressure turbine pump emulsification process, the emulsifier to sizing agent ratio may be 0.65:1.00, 0.70:1.00, 0.75:1.00, 0.80:1.00, 0.85:1.00, 0.90:1.00, 0.95:1.00, 1.00:1.00, 1.05:1.00, 1.10:1.00, 1.15:1.00, 1.20:1.00, 1.25:1.00, or 1.30:1.00, based on volume. In a specifically preferred embodiment, when using a high pressure turbine pump emulsification unit, the emulsifier to ASA volume ratio ranges from 0.6-0.95:1.0 with a percentage of GPAM in the turbine loop of 0.6-1.8% (based on solids).

In certain embodiments, when using a high shear homogenizer emulsification unit, the emulsifier to sizing agent ratio (e.g., GPAM to ASA emulsification ratio) should range from 0.6:1.0 to 1.0:1.0, on a volume ratio. In certain embodiments, when using a high shear homogenizer emulsification process, the emulsifier to sizing agent ratio may be 0.60:1.00, 0.65:1.00, 0.70:1.00, 0.75:1.00, 0.80:1.00, 0.85:1.00, 0.90:1.00, 0.95:1.00, or 1.00:1.00, based on volume. In a specifically preferred embodiment, when using a high shear homogenizer emulsification unit, the emulsifier to ASA volume ratio ranges from 0.6-1.0:1.0 with a percentage of GPAM in the turbine loop of 0.3-0.9% (based on solids).

The higher emulsifier to sizing agent ratios (e.g., 1.30:1.00) are preferably only used with the high pressure turbine pump emulsification unit, the upper limit for preparation of sizing emulsions with the high shear homogenizer preferably being 1.00:1.00.

Preparing a sizing emulsion according to the parameters disclosed for the high pressure turbine pump emulsification unit can provide sizing emulsions with a median particle size of 2.5 micron or less, 2.3 micron or less, 2.0 micron or less, 1.9 micron or less, 1.8 micron or less, 1.7 micron or less, 1.6 micron or less, 1.5 micron or less, 1.4 micron or less, 1.3 micron or less, 1.2 micron or less, 1.1 micron or less, or 1.0 micron or less; and particle size at which 90% of the population is less than ($D_{90}$) 6.0 micron or less, 5.0 micron or less, 4.0 micron or less, 3.9 micron or less, 3.8 micron or less, 3.7 micron or less, 3.6 micron or less, or 3.5 micron or less.

Preparing a sizing emulsion according to the parameters disclosed for the high shear homogenizer emulsification unit can provide sizing emulsions with a median particle size of 1.1 micron or less, 1.0 micron or less, 0.9 micron or less, or 0.8 micron or less; and particle size at which 90% of the population is less than ($D_{90}$) 2.4 micron or less, 2.1 micron or less, 2.0 micron or less, 1.9 micron or less, 1.8 micron or less, 1.7 micron or less, 1.6 micron or less, 1.5 micron or less, 1.4 micron or less, 1.3 micron or less, or 1.2 micron or less.

The sizing emulsions prepared according to the parameters for the high pressure turbine pump or the high shear homogenizer can provide sizing efficiencies expressed in Cobb 60 values of 80 or less, 70 or less, 60 or less, 50 or less, 40 or less, 30 or less, 20 or less, or 10 or less. The sizing emulsions prepared according to the parameters for the high pressure turbine pump or the high shear homogenizer can provide sizing efficiencies expressed in values from a boiling boat test of 600-1800s (10-30 min).

In addition, sizing emulsions prepared according to the parameters for the high pressure turbine pump or the high shear homogenizer can reduce required sizing agent (e.g., ASA) dosage by 10-50%.

4. METHODS OF SIZING

There are many factors that can affect sizing performance on a paper machine. Some are due to the chemical properties of the furnish or chemical additives being used to make the paper. Sizing performance can also be affected by the operational parameters of the paper machine itself. Constant monitoring, adjustment of paper making conditions along with proper treatment and make down of the sizing emulsion helps ensure optimal sizing performance.

For optimal sizing performance, sizing agents such as ASA are preferably evenly distributed, anchored, and properly oriented on the fiber surface. Retention of the sizing agent is extremely important as unretained sizing molecules can hinder sizing performance. Retention efficiency of small particles, including ASA, during the paper making process is maximized using specific chemical programs in the wet end of the paper machine. ASA retention efficiency is also greatly affected by the charge demand of the paper furnish. So as the charge of the system changes due to variability in furnish components or additives, ASA retention can change and possibly reduce sizing efficiency. There are also chemicals present in the papermaking process that can reduce sizing efficiency. They are mainly surface-active materials that act as anti-sizing agents, which include defoamers, dye formulations, contaminants from the pulping process, etc. If these contaminants are not properly removed from the system or kept at minimal concentration levels, sizing performance can be negatively affected. In the drying section of the paper machine, ASA is evenly distributed on the fiber surface via vapor phase transport. Failure to properly dry the sheet or reach certain elevated temperatures in the drying section can cause a loss of sizing efficiency.

In addition to paper making conditions on the machine, the treatment of the sizing emulsion itself and how it is delivered to the machine can effect sizing efficiency. ASA emulsions readily react with water and can turn into a chemical form that does not size the sheet optimally. This is referred to as hydrolyzed ASA. In order to prevent ASA from hydrolyzing and to improve its stability, the sizing emulsion is preferably maintained at a specified temperature and pH range. The addition point of a ASA sizing emulsion to a paper making process also varies from machine to machine based on the properties of the furnish or grade being manufactured. If the emulsion is not fed properly to the machine, unwanted interactions with chemicals or furnish components such as calcium carbonate can occur and reduce sizing efficiency.

The sizing emulsions disclosed herein can be fed to a paper or paperboard production process as an emulsion containing a solids content as described herein. The final sizing emulsion is normally fed to the wet end of a paper machine, which can include thin stock, thick stock, or white water systems. Most typically the sizing emulsions are fed in the thin stock approach line to a headbox, which also includes a white water system (e.g., pre-fan pump). Although wet end addition of the sizing emulsion is the norm, any addition point that can introduce the composition to the final paper sheet can yield a sized sheet and can be used in implementing a method of the invention in various embodiments. Examples are disclosed in U.S. Pat. Nos. 4,657,946 and 7,455,751.

In certain embodiments, a mixing chamber is used to introduce the sizing emulsion into the papermaking process. Examples of such mixing chambers are disclosed in U.S. patent Ser. No. 11/339,169, "Method and Arrangement for Feeding Chemicals into a Process Stream," (available from Nalco Company in Naperville, Ill.) and the Ultra Turax, model no. UTI-25 (available from IKA® Works, Inc. in Wilmington, N.C.). It is envisioned that any suitable reactor or mixing device/chamber may be utilized in the method of the invention.

As described above, in certain embodiments, a secondary carrier solution may be added at various points in the paper making process. The secondary carrier solution may comprise additional emulsifier (e.g., GPAM). In addition or alternatively to, additional emulsifier may be added at the point of addition of the sizing emulsion into the papermaking process. The additional GPAM may be fed into secondary carrier water with a ratio ranging from 1:1 to 100:1 (Water:GPAM). The ratio of dilution may depend on the dosage of GPAM and the final concentration of the emulsified product (e.g., ASA: GPAM emulsion).

5. EXAMPLES

The foregoing may be better understood by reference to the following examples, which are intended for illustrative purposes and are not intended to limit the scope of the invention.

Example 1

In this example, an embodiment of the invention using 5 mol % DADMAC (Diallyldimethylammonium chloride)/AcAm polymer glyoxalated with a 0.8 mole ratio of glyoxal to AcAm was used as the emulsion stabilizer (Polymer 1) and compared against a 10 mol % DMAEM*MCQ (Dimethylammoniumethylmethyacrylated methylchloride quat)/AcAm (acrylamide) emulsion stabilizer (Polymer 2). The ASA used in the tests was a commercially available formulation derived from a mixture of $C_{16}$ and $C_{18}$ alkenyl chains (available as N7540 from Nalco Company, Naperville, Ill.) at a concentration of 100% (typically ASA is available neat) was used for the following test method.

Tests were conducted on a dual headbox Fourdrinier paperboard machine producing about 600 tons/day of linerboard using 100% recycle fiber derived from old corrugated containers. The test method comprised substituting Polymer 1 in lieu of Polymer 2 as the emulsion stabilizer for an internal sizing application. The ratio of Polymer 1 to Polymer 2 was slowly increased, with a ratio of 1:1 occurring at Reel No. 5 ending with 1:0 at Reel No. 8. At Reel No. 11, the ratio was changed to 0:1 (i.e., a reversion to 100% Polymer 2). The various ratios of polymers were added to the size turbine on the emulsification skid at the wet end of the papermachine, where the consistency varied from 0.35-0.90%. The emulsion was fed just after the pressure screen on the furnish approach to the headbox. Results are shown in Table 1.

Observed from the results in Table 1, was a significant unexpected improvement in sizing at 100% Polymer 1 (Reel No. 10). In addition, the wet line appeared to go towards the couch even when sheet at the reel became drier, and the fiber orientation by Tensile Stiffness Orientation ("TSO") was effected enough to cause a need for adjustments to the papermachine (e.g., rush to drag, indicating significant increase in drainage rate). Partial Polymer 1 substitution (Reel No. 5) did not result in any of the observable effects.

Example 2

Tests were conducted on a dual headbox Fourdrinier paperboard machine producing about 600 tons/day of linerboard using 100% recycle fiber derived from old corrugated containers. In this example, Polymer 1 and Polymer 2 were used and compared as the emulsion stabilizer as in example 1. FIG. 1 graphically illustrates Reel Moisture and Steam Pressure as a function of time.

Several unexpected observations were made from the data shown in FIG. 1. The sheet moisture at the reel dropped dramatically from 7.6 to 6.1 wt % in a matter of a few minutes after switching from Polymer 1 to Polymer 2. Sheet moisture drop was then recovered automatically through steam reductions from 160 to 153 psi. Top ply vacuum seal pit level increases were also observed, indicating more effective vacuum dewatering, and excess bottom ply white overflow increases were observed within a few minutes, indicating increased forming section dewatering. When the test was returned to the Polymer 1 emulsion, a nearly immediate reversion of these benefits was observed. Moreover, CSF (i.e., pulp freeness) tests did not reveal any noticeable increase in drainage rate when the sizing emulsion having Polymer 2 was added, indicating this conventional measurement of drainage did not change.

Example 3

Tests were conducted on a dual headbox Fourdrinier paperboard machine producing about 600 tons/day of linerboard using 100% recycle fiber derived from old corrugated containers. It was observed that use of a 5 mol % DADMAC/AcAm backbone used to prepare Polymer 2 for ASA emulsification resulted in a loss in sizing, indicating that simple cationic copolymers without aldehyde-functionalization hurt performance and demonstrating the need for such functionalization in this application.

Example 4

Tests were conducted on a dual headbox Fourdrinier paperboard machine producing about 600 tons/day of linerboard using 100% recycle fiber derived from old corrugated containers. It was observed that addition of Polymer 2 (by itself without being emulsified with the ASA sizing additive) to the wet end of the papermachine (e.g., thin stock) actually yields less sizing (as measured by increased Cobb value) demon-

TABLE 1

| Reel No. | 3 | 4 | 5 | 6 | 7 | 8 | 9 | 10 | 11 | 12 | 13 | 14 | 15 |
|---|---|---|---|---|---|---|---|---|---|---|---|---|---|
| Top 10 min. Cobb | 115 | 110 | 95 | 92 | 96 | 92 | 83 | 64 | 103 | 111 | 106 | 110 | 103 |
| Bottom 10 min. Cobb | 110 | 106 | 94 | 84 | 88 | 83 | 73 | 54 | 93 | 105 | 95 | 100 | 97 | strating that the polymer of the invention must be added as part of the ASA sizing additive to achieve the demonstrated beneficial sizing results.

Example 5

Figure 2:
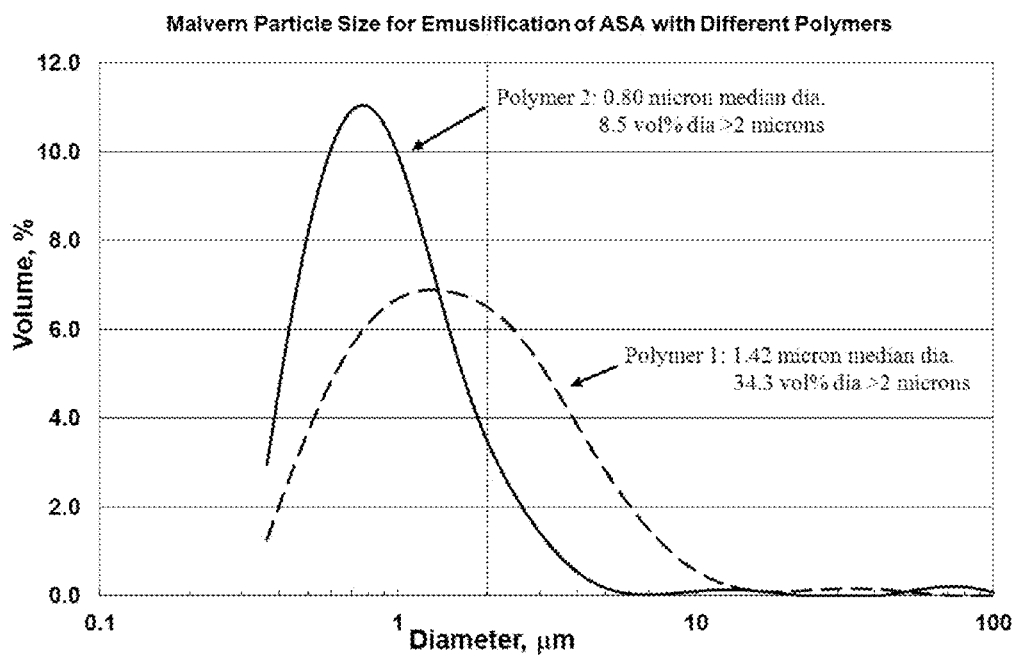
FIG. 2 shows Malvern Mastersizer distributions (vol % of emulsion particles with a given diameter) for ASA emulsions prepared with an existing polymeric emulsifier containing a surfactant and polymers of the invention.

It is known that emulsions prepared with smaller particle size and narrower distributions will yield improved sizing (e.g., U.S. Pat. No. 4,657,946; J. C. Roberts, "Neutral and Alkaline Sizing" in Paper Chemistry, J. C. Roberts, Ed., Chapman and Hall: New York, 1991). FIG. 2 shows Malvern Mastersizer distributions (vol % of emulsion particles with a given diameter) for ASA emulsions prepared with an existing polymeric emulsifier containing about 1 wt % of surfactant (e.g., ethoxylated alkyl phosphate ester) and with the aldehyde-functionalized polymers of the invention. As indicated in the FIG. 2, the median diameter of the emulsion prepared with glyoxalated DADMAC/AcAm (10/90 wt ratio) with 0.8 glyoxal to AcAm ratio (Polymer 1) is 78% larger than with the best standard emulsifier (consisting of 19.8 wt % DMAEM*MCQ (dimethylaminoethylmethacrylate methylchloride quat)/AcAm (acrylamide) (10/90 mole ratio)+1 wt % surfactant ethoxylated tridecyl alcohol phosphate ester (Polymer 2). Additionally, the emulsion size greater than 2 microns diameter is dramatically larger for the emulsion prepared with the glyoxalated polymer. The size distribution of the glyoxalated polymer prepared emulsion is also seen to be much broader. FIG. 2 also shows that the glyoxalated polymer produced poorer emulsion as judged by particle size properties.

Figure 3:
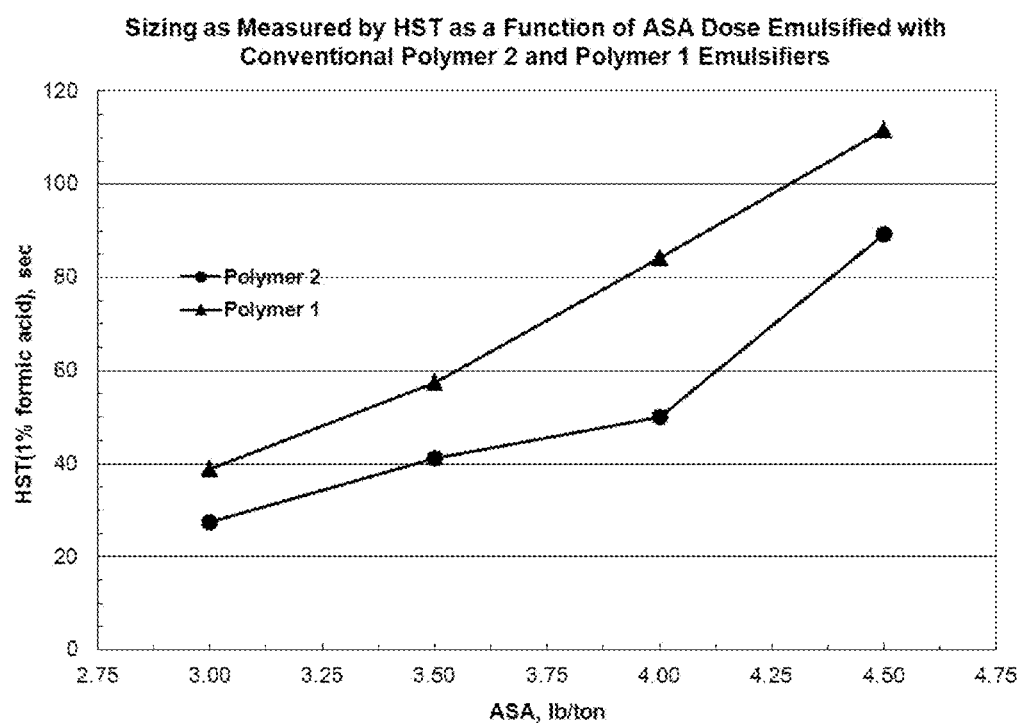
FIG. 3 shows that the sizing effect on laboratory prepared handsheets as measured by Hercules Sizing Test ("HST") method was unexpectedly better with glyoxalated polymer emulsion.

Even though the particle size distribution of the ASA emulsion prepared with glyoxalated polymer was poorer than the emulsion prepared with standard emulsifier, FIG. 3 shows that the sizing effect on laboratory prepared handsheets as measured by HST method was unexpectedly better with the glyoxalated polymer emulsion, in contradiction to the accepted belief by those skilled in the art that a better emulsion yields better sizing. The furnish used in the testing of FIG. 3 was recycled board furnish. The HST test evaluates the sizing (water penetration in the sheet) by optically measuring the time for a dye solution to penetrate the sheet. In the HST tests conducted the dye solution also contained 1 wt % formic acid. FIG. 3 shows the improved sizing obtained with the ASA emulsions prepared with the particle size distribution of the ASA emulsion prepared with glyoxalated polymer even though the emulsion size distribution is poorer than the comparative emulsion.

Example 6

ASA Emulsions Preparation

This example describes exemplary glyoxalated polyDADMAC-acrylamide (GPAM) and alkenyl succinic anhydride (ASA) emulsions according to the invention. The GPAMs varied in both their mole percent backbone levels of diallyldimethylammonium chloride (DADMAC) and their average molecular weights. In Table 2, the weight average molecular weight (AVG Mw) and Brookfield viscosity are provided for GPAM samples comprising (1) 5 mole % DADMAC backbone, (2) 12 mole % DADMAC backbone, and (3) 5 mole % DADMAC backbone with $MgSO_4 \cdot 7H_2O$ salt. The GPAM samples 119-1 and 119-2 comprising 5 mole % DADMAC backbone with $MgSO_4 \cdot 7H_2O$ salt were prepared by adding 6 wt % $MgSO_4 \cdot 7H_2O$ prior to glyoxal functionalization.

TABLE 2

| Sample ID# | BFV (cps) | AVG Mw (kD) |
|---|---|---|
| GPAM, 5 mole % DADMAC Backbone | | |
| 112-1 | 11.3 | 1000 |
| 112-2 | 13.6 | 1300 |
| 112-3 | 18.2 | 1900 |
| 112-4 | 24.7 | 2400 |
| GPAM, 12 mole % DADMAC Backbone | | |
| 114-1 | 10.6 | 500 |
| 114-2 | 14.2 | 1300 |
| 114-3 | 21.2 | 1600 |
| 114-4 | 25.4 | 1800 |
| GPAM, 5 mole % DADMAC Backbone + $MgSO_4 \cdot 7H_2O$ salt | | |
| 119-1 | 11.9 | 650 |
| 119-2 | 15.2 | 1200 |

Sizing emulsions were prepared according to the procedures described herein. An emulsion comprising 5 mole percent ASA was prepared by mixing 14 grams of ASA, 22 grams of GPAM, and 244 grams of tap water (measured total hardness of 135 ppm $CaCO_3$) in an Osterizer® mini-cup blender for two minutes at room temperature.

A secondary emulsion comprising 0.172 mole percent ASA was prepared by mixing the above emulsion with a fresh water source.

Example 7

Emulsion Stability

Samples of the representative emulsions described in Table 2 were taken after 2 minutes of mixing and measured for particle size distribution using a laser light scattering technique after 0, 30, and 60 minutes of aging time at room temperature. The particle size distributions (relating to emulsion stability) are shown in Table 3.

Table 3 suggests that emulsion stability decreases with an increase in weight averaged molecular weight when using GPAM synthesized using a 5 mole percent DADMAC backbone. For example, a comparison between Sample ID Nos. 112-1 and 112-4 (corresponding to GPAM, five mole percent DADMAC backbones with average molecular weights of 1000 kD and 2400 kD, respectively) shows that the lower molecular weight sample exhibits a smaller median volume and a smaller percentage of particles with size above 2 micrometer (μm). Table 3 also suggests that emulsion stability is significantly improved when the emulsion comprises GPAM synthesized using the higher cationic charge 12 mole % DADMAC backbone, resulting in a product with a higher cationic charge. For example, comparing Sample ID Nos. 112-2 and 114-2 together (both of which possess average molecular weights of 1300 (kD)), reveals that Sample ID No. 114-2 displays a smaller median volume and a smaller percentage of particles with size above 2 micrometer than Sample ID No. 112-2 at 0, 30 and 60 minutes. When GPAM is synthesized using a 5 mole % DADMAC backbone in the presence of $MgSO_4 \cdot 7H_2O$, the emulsion stability is significantly improved over GPAM synthesized using a 5 mole % DADMAC backbone without $MgSO_4 \cdot 7H_2O$. For example, Sample ID No. 119-2 has a median volume of less than one-half the median volume of Sample ID No. 112-2, and a smaller percentage of particles with size above 2 micrometer.

TABLE 3

| | 5% ASA | | 0.172% ASA | | | 5% ASA | | 0.172% ASA | | | | |
|---|---|---|---|---|---|---|---|---|---|---|---|---|
| Size Emulsifier | Median (μm, vol) | >2 μm | Median (μm, vol) | >2 μm | Size Emulsifier | Median (μm, vol) | >2 μm | Median (μm, vol) | >2 μm | Size Emulsifier | Median (μm, vol) | >2 μm |
| 0 mins | | | | | | | | | | | | |
| 112-1 | 2.36 | 54.79 | 3.05 | 60.20 | 114-1 | 1.43 | 37.59 | 1.42 | 37.11 | 119-1 | 1.37 | 34.30 |
| 112-2 | 3.61 | 64.64 | 2.71 | 58.75 | 114-2 | 1.30 | 32.88 | 1.32 | 33.57 | 119-2 | 1.50 | 38.43 |
| 112-3 | 3.26 | 62.43 | 3.99 | 65.51 | 114-3 | 1.36 | 34.44 | 1.41 | 36.55 | | | |
| 112-4 | 4.19 | 68.34 | 5.72 | 70.79 | 114-4 | 1.43 | 37023 | 1.57 | 41.35 | | | |
| 30 mins | | | | | | | | | | | | |
| 112-1 | 4.15 | 67.82 | 3.91 | 65.17 | 114-1 | 1.38 | 35.27 | 1.5 | 39.46 | 119-1 | 1.28 | 30.83 |
| 112-2 | 6.01 | 73.39 | 3.51 | 65.41 | 114-2 | 1.24 | 30.22 | 1.35 | 34.32 | 119-2 | 1.41 | 35.42 |
| 112-3 | 6.27 | 74.94 | 6.13 | 72.60 | 114-3 | 1.30 | 32.35 | 1.42 | 36.82 | | | |
| 112-4 | 6.84 | 76.12 | 9.57 | 77.82 | 114-4 | 1.49 | 38.22 | 1.52 | 40.01 | | | |
| 60 mins | | | | | | | | | | | | |
| 112-1 | 4.52 | 69.61 | 4.19 | 66.95 | 114-1 | 1.48 | 38.94 | 1.48 | 38.85 | 119-1 | 1.28 | 30.81 |
| 112-2 | 7.50 | 77.01 | 4.13 | 71.00 | 114-2 | 4.43 | 37.25 | 1.37 | 34.98 | 119-2 | 1.42 | 36.11 |
| 112-3 | 9.74 | 80.61 | 7.47 | 78.36 | 114-3 | 1.33 | 33.73 | 1.45 | 37.71 | | | |
| 112-4 | 8.91 | 80.16 | 14.04 | 84.33 | 114-4 | 1.55 | 40.54 | 1.59 | 41.62 | | | |

Example 8

Sizing Efficiency

The emulsions described above in Table 2 were also tested during a field trial on a paper machine to determine their effect on sizing efficiency in a gypsum board mill. The GPAM to ASA ratio was 0.6 to 1.0 based on product. ASA flows to the top and base ply were adjusted accordingly to maintain Cobb sizing targets. Table 4 shows the ASA usage rates during the trial.

The data in Table 4 suggests that sizing efficiency improves slightly when GPAM emulsifier synthesized with a 5 mole % DADMAC backbone contains the $MgSO_4 \cdot 7H_2O$ salt. Table 4 also suggests the sizing efficiency improves significantly when the GPAM emulsifier is synthesized with the 12 mole % DADMAC backbone.

TABLE 4

| | Min | Max | Ave | Count |
|---|---|---|---|---|
| Day 1 (11 AM)-Day 3 (8:30 AM) | | | | |
| GPAM, 5 mole % DADMAC-BB | | | | |
| Top ply ASA flow, GPM | 4.5 | 6.9 | 6.17 | 571 |
| Base ply ASA flow, GPM | 6.2 | 7.5 | 6.7 | |
| Estimated Dosage, LB/TON | | | 6.4 | |
| Day 3 (8:42 AM)-Day 3 (7:54 AM) | | | | |
| GPAM, 5 mole % DADMAC-BB + salt | | | | |
| Top ply ASA flow, GPM | 5.5 | 6.6 | 6.13 | 318 |
| Base ply ASA flow, GPM | 5.4 | 6.4 | 5.98 | |
| Estimated Dosage, LB/TON | | | 6.06 | |
| Day 4 (8:07 AM)-Day 3 (6:58 AM) | | | | |
| GPAM, 12 mole % DADMAC-BB | | | | |
| Top ply ASA flow, GPM | 4.3 | 6 | 5.64 | 306 |
| Base ply ASA flow, GPM | 3.9 | 5.6 | 4.64 | |
| Estimated Dosage, LB/TON | | | 5.14 | |

Example 9

High Shear Process for ASA Emulsification

GPAM size emulsification trials were conducted on board and packaging grade machines, which demonstrated how the GPAM emulsified ASA emulsion quality affected sizing performance.

Table 5 shows the particle size distribution and sizing performance results of ASA emulsified with GPAM used to size a white top Kraft linerboard grade. A high shear homogenizer emulsification unit was used for the trial. Particle size distribution is presented as $D_{50}$ (median particle size) and $D_{90}$ (particle size at which 90% of the population is less than). As the particle size distribution becomes larger the $D_{90}$ value will increase. The vital information in Table 5 is the emulsifier to ASA volume ratio and GPAM percent in the turbine loop. Varying these parameters impacts particle size distribution and sizing performance. In this case, sizing performance is indicated by the Cobb 60 value. This value shows the amount of water absorption after 60 seconds. As the Cobb 60 value decreases, sizing performance improves. The median emulsion particle size increases when the emulsifier to ASA volume ratio is lowered from 1.0 to 0.8. This is due to the decreasing GPAM % in the turbine loop, which also results in lower sizing efficiency indicated by an increase in the Cobb 60 value. While maintaining an emulsifier to ASA volume ratio of 0.8:1.0, the GPAM % is increased from 0.35% to 0.52% by removing water from the emulsification process. This results in smaller median emulsion particle sizes and improves sizing performance as evidenced by a decrease in Cobb 60 values. Further reduction in the emulsifier to ASA volume ratio provides an improved median particle size ($D_{50}$) of the emulsion but broadens the particle size distribution measured as an increase in $D_{90}$, which negatively impacts sizing performance as the Cobb 60 value increases.

Figure 4:
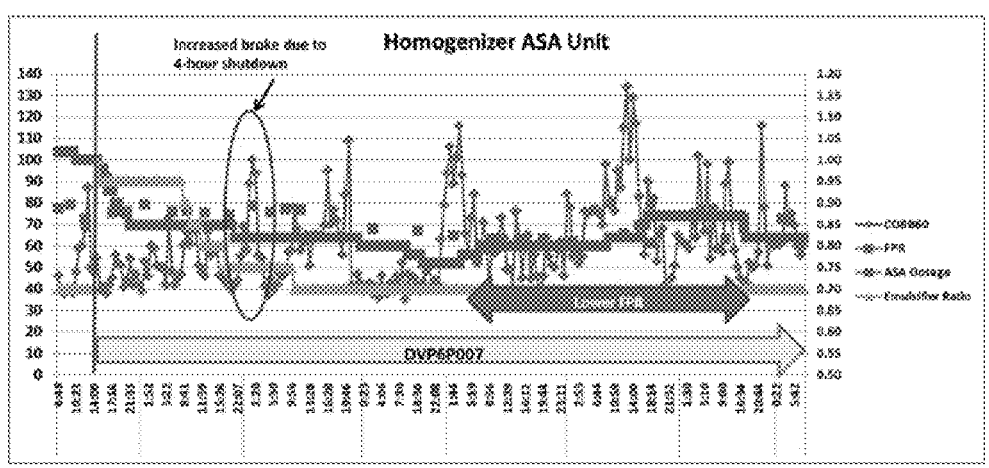
FIG. 4 shows sizing performance of GPAM emulsification technology as a function of emulsifier to ASA ratio and size dose.

FIG. 4 shows the sizing performance results from the paper machine trial using the GPAM emulsification technology with the high shear homogenizer emulsification unit. As mentioned previously, sizing performance is determined by the Cobb 60 value. This Cobb 60 value is controlled on the paper machine by adjusting the ASA dose. A low ASA dosage is preferred as well as a low emulsifier to ASA ratio. Each step change in emulsifier to ASA ratio in FIG. 4 correlates to the data presented in Table 5. A significant improvement in sizing performance resulted when the GPAM chemistry was used to emulsify ASA in place of the conventional emulsifier. This is demonstrated by the reduction in size dose to meet the target Cobb 60 value. No loss in performance was observed when lowering the GPAM to ASA emulsification ratio to 0.7:1.0 on a volume basis.

TABLE 5

Homogenizer ASA Unit

| Volume Ratio Emulsifier:ASA | GPAM % in turbine loop | Particle Size D50 micron | Particle Size D90 micron | Cobb 60 Winder Target - 80 grams |
|---|---|---|---|---|
| 1.00:1.00 | 0.52 | 0.82 | 1.28 | 101 |
| 0.95:1.00 | 0.40 | 0.89 | 1.33 | 42 |
| 0.90:1.00 | 0.40 | 0.98 | 1.69 | 60 |
| 0.85:1.00 | 0.38 | 1.0 | 2.1 | 48 |
| 0.80:1.00 | 0.35 | 1.05 | 1.96 | 67 |
| 0.80:1.00 | 0.38 | 1.04 | 1.93 | 48 |
| 0.80:1.00 | 0.42 | 1.01 | 1.88 | 58 |
| 0.80:1.00 | 0.46 | 0.97 | 1.75 | 59 |
| 0.80:1.00 | 0.52 | 0.93 | 1.69 | 45 |
| 0.75:1.00 | 0.45 | 0.90 | 1.87 | 44 |
| 0.70:1.00 | 0.42 | 0.89 | 2.33 | 68 |

The results from Table 5 and FIG. 4 below demonstrate the following: When emulsifying ASA with GPAM, sizing performance decreases when the emulsion median particle size increases or the particle size distribution broadens; as the emulsifier to ASA volume ratio is lowered the percentage of GPAM present in the turbine loop decreases, which increases the emulsion's median particle size resulting in a decrease in sizing efficiency; at a fixed emulsifier to ASA ratio, the median particle size of the emulsion improves as the percentage of GPAM in the turbine loop is increased. This improves sizing performance on the machine; and at a fixed percentage of GPAM in the turbine loop, the median particle size increases as the emulsifier to ASA volume ratio decreases.

Based on this performance data and results from additional trials it was determined that the best practice for emulsifying ASA with GPAM using a high shear homogenizer emulsification unit is an emulsifier to ASA volume ratio of 0.6-1.0:1.0 with a percentage of GPAM in the turbine loop of 0.3-0.9% (based on solids).

Example 10

High Pressure Process for ASA Emulsification

GPAM size emulsification trials were conducted on board and packaging grade machines, which demonstrated how the GPAM emulsified ASA emulsion quality affected sizing performance.

Table 6 shows the particle size distribution and emulsification parameters of a high pressure turbine emulsification unit. This emulsification trial was held at a gypsum board mill. As mentioned above, particle size distribution is presented as $D_{50}$ (median particle size) and $D_{90}$ (particle size at which 90% of the population is less than). The vital information in Table 6 is the emulsifier to ASA volume ratio and GPAM % in turbine loop. These parameters are adjusted accordingly to control emulsion particle size. Optimal particle size is obtained at an emulsifier to ASA ratio of 0.65-1.0:1.0. Independent of the emulsifier to ASA volume ratio, the particle size is best at a percentage of GPAM in the loop of 1.0%. This data suggests the high pressure turbine pump emulsification unit has a tighter operating window for GPAM % in the turbine loop compared to the high shear homogenizer emulsification unit.

TABLE 6

Turbine ASA Unit

| Volume Ratio Emulsifier:ASA | GPAM % in turbine loop | Particle Size D50 micron | Particle Size D90 micron |
|---|---|---|---|
| 1.00 | 0.94 | 1.03 | 3.60 |
| 1.00 | 0.94 | 1.00 | 3.55 |
| 1.00 | 1.42 | 1.17 | 5.24 |
| 0.80 | 1.14 | 2.57 | 6.19 |
| 0.80 | 1.44 | 1.87 | 5.81 |
| 0.70 | 1.22 | 2.29 | 6.32 |
| 0.70 | 0.95 | 1.20 | 4.35 |
| 0.65 | 0.95 | 1.17 | 4.76 |
| 0.65 | 0.95 | 1.22 | 3.79 |
| 0.65 | 0.95 | 1.16 | 4.88 |
| 0.65 | 0.95 | 1.10 | 4.37 |

Figure 5:
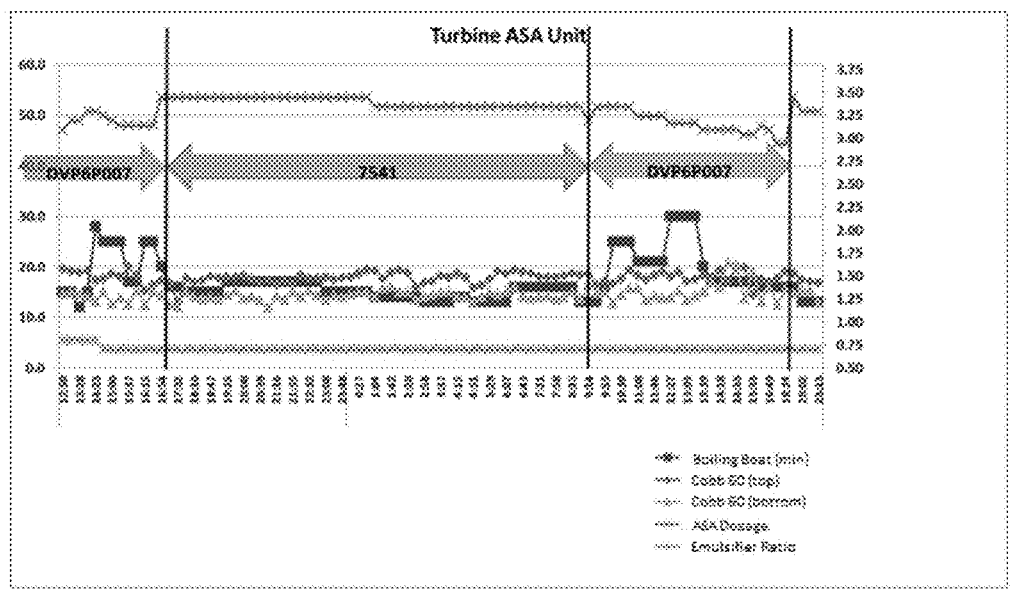
FIG. 5 shows sizing performance of GPAM emulsification technology as a function of emulsifier to ASA ratio and size dose compared to conventional emulsifier technology.

FIG. 5 shows the sizing performance results of the emulsification trial using the emulsions shown in Table 6. In FIG. 5, sizing performance is shown by the boiling boat test. An increase in the boiling boat value correlates to an improvement in sizing performance. The data shows that higher boiling boat values were achieved with the GPAM emulsification technology (DVP6P007) compared to the conventional emulsifier (7541) at lower ASA dosages. The data also shows that when using the GPAM emulsification technology that the boiling boat values decreased as the median particle size of the emulsion increased.

When using a high pressure turbine emulsification unit the best practice for emulsifying ASA with GPAM is an emulsifier to ASA volume ratio of 0.6-1.3:1.0, more preferably 0.6-0.95:1.0, with a percentage of GPAM in the turbine loop of 0.6-1.8% (based on solids).

Example 11

Sizing Efficiency with Large Particle Size

Figure 6:
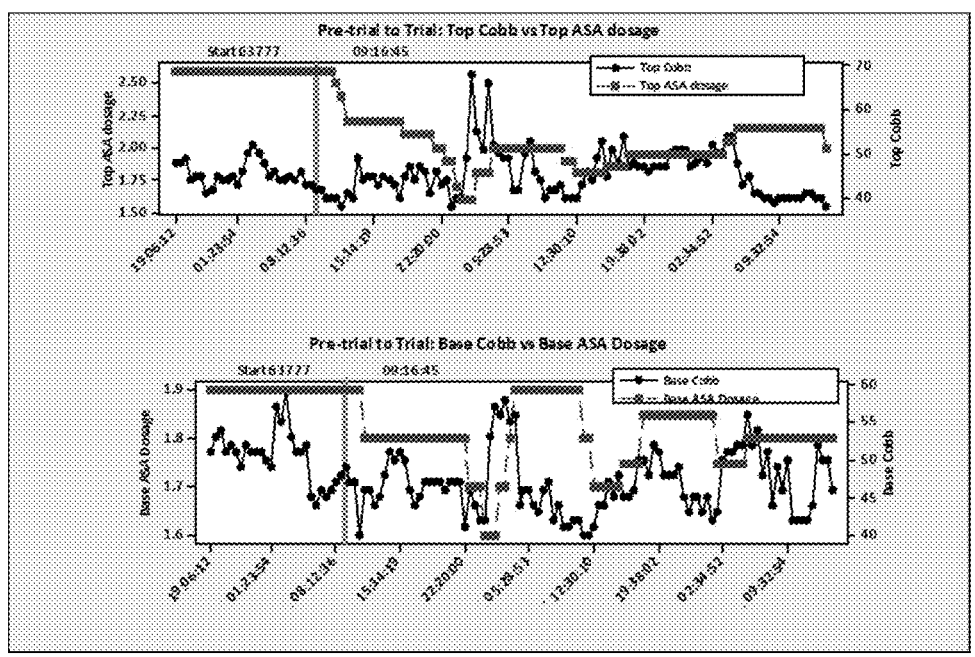
FIG. 6 shows paper machine trial data using large particle size GPAM/ASA emulsions.

Table 7 shows paper machine trial data where GPAM emulsified ASA produced very large particle size, yet on-machine performance was excellent, as illustrated by the associated FIG. 6 where ASA dosage was significantly reduced. This was not expected from a particle size that is greater than 50 micron. The mean diameter in Table 7 is the average diameter of the measured emulsion particles. The median diameter is the value at which 50% of the measured emulsion particles are above and 50% are below this diameter. These values give an idea of the particle size distribution in the emulsion. It is common for those in the paper making industry to report the median diameter value. The emulsifier and ASA flows are the volumes being fed to the emulsification unit to make the primary emulsion. These flows are used to calculate the emulsifier to ASA volume ratio. The data in Table 7 correlates with sizing performance results shown in FIG. 6 and show that an improvement in ASA sizing efficiency was achieved on the paper machine even with large emulsion particle sizes. This result was not expected and would not be predicted based on current industry knowledge.

TABLE 7

| | Particle Size Distribution | | | | |
|---|---|---|---|---|---|
| | D[4, 3] (mean diameter) micron | D[v, 0.5] (median diameter) micron | Emulsifier:ASA volume ratio | Emulsifier Flow ml/min | ASA Flow ml/min |
| Day 1 | 279.7 | 307.93 | 0.55:1.0 | 940 | 1700 |
| Day 1 | 193.4 | 188.25 | 1.33:1.0 | 2270 | 1700 |
| Day 1 | 231 | 229.71 | 1.33:1.0 | 2270 | 1700 |
| Day 1 | 127.34 | 122.96 | 1.33:1.0 | 2270 | 1700 |
| Day 1 | 442.22 | 490.46 | 1.33:1.0 | 2270 | 1700 |
| Day 1 | 61.27 | 56.39 | 1.33:1.0 | 2270 | 1700 |
| Day 1 | 57.55 | 37.56 | 1.33:1.0 | 2270 | 1700 |
| Day 1 | 114.48 | 95.04 | 1.33:1.0 | 2270 | 1700 |
| Day 1 | 70.26 | 64.19 | 1.20:1.0 | 2033 | 1700 |
| Day 2 | 183.52 | 164.5 | 1.20:1.0 | 2033 | 1700 |
| Day 2 | 100.43 | 99.18 | 1.20:1.0 | 2033 | 1700 |
| Day 2 | 88.99 | 84.28 | 1.20:1.0 | 2033 | 1700 |
| Day 2 | 103.12 | 88.53 | 1.12:1.0 | 1900 | 1700 |
| Day 3 | 51.78 | 44.1 | 1.12:1.0 | 1900 | 1700 |
| Day 3 | 212.47 | 208.85 | 1.12:1.0 | 1900 | 1700 |
| Day 3 | 114.08 | 103.58 | 1.12:1.0 | 1900 | 1700 |

Comparative Example 12

Sizing Efficiency without ASA Emulsification

FIGS. 7-10 demonstrate that introduction of GPAM, such as to provide wet- or dry-strength, and ASA into the papermaking process without emulsification results in increase in Cobb value and an increase in required ASA flow, and thus a loss of sizing efficiency.

Figure 7:
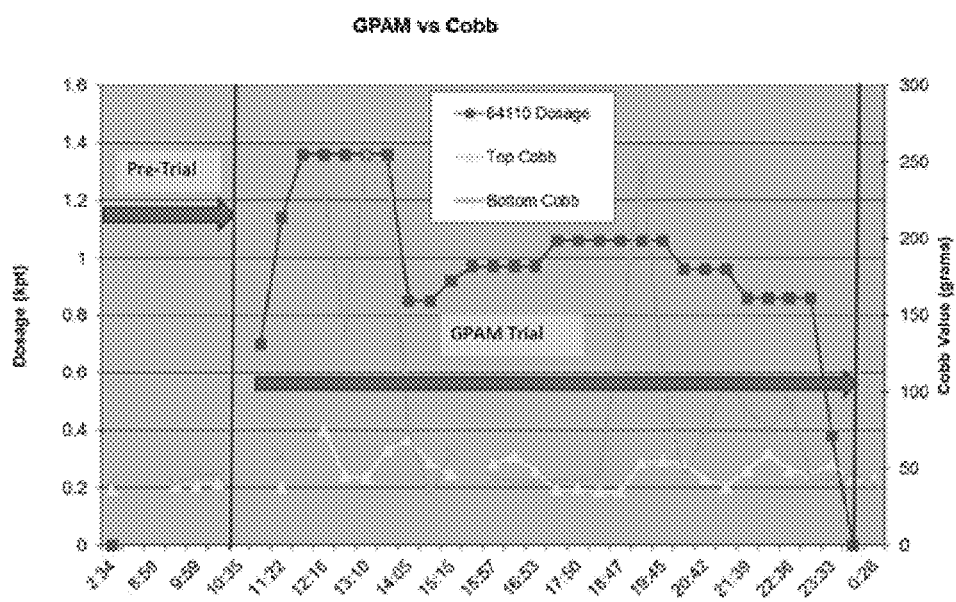
FIGS. 7-10 show sizing efficiency when GPAM and ASA are introduced into the papermaking process without emulsification.

FIG. 7 shows machine data from a trial which shows that the addition of the GPAM strength resin caused a loss in sizing performance as indicated by an increase in top and bottom Cobb values. During the trial, the GPAM dose was lowered in an effort to meet sizing targets.

Figure 8:
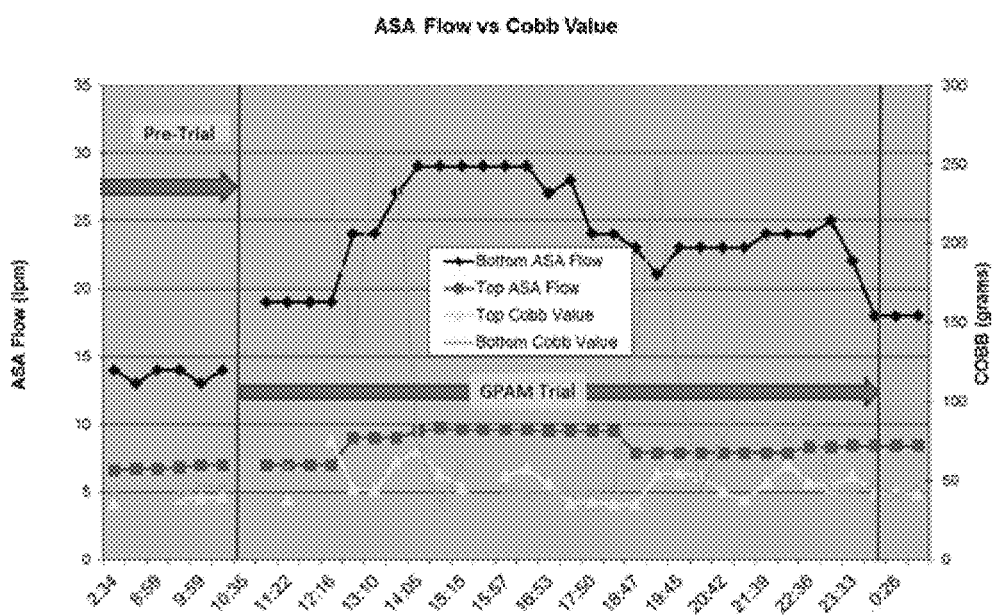

FIG. 8 shows machine data from a trial which shows that the addition of the GPAM strength resin caused a loss in sizing performance as indicated by an increase in top and bottom Cobb values. During the trial, the ASA dose fed to the top and bottom plies had to be increased to meet the sizing target. This increase in size dose correlates with a decrease in GPAM strength resin dose. The timeline for FIG. 8 matches that of FIG. 7 and shows the ASA dose (flows) during GPAM trial.

Figure 9:
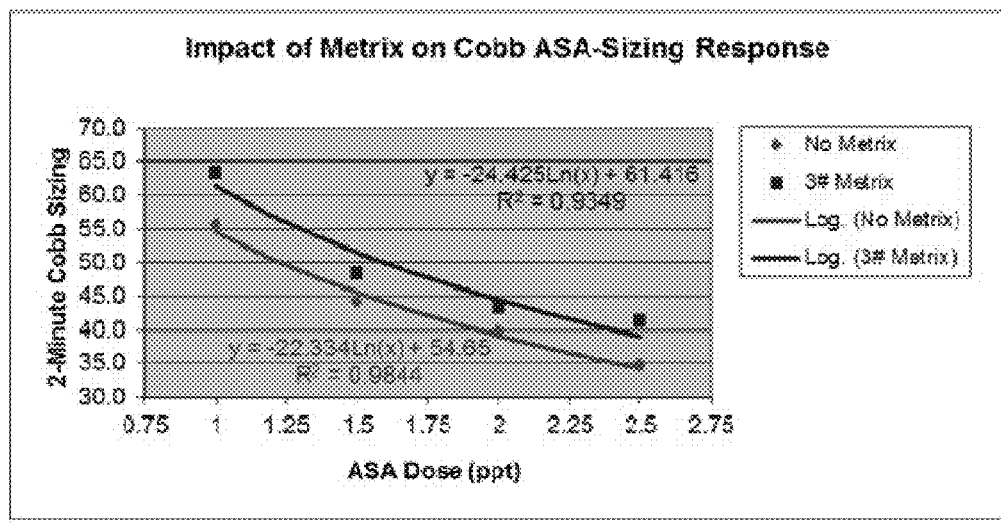

FIG. 9 shows lab sizing performance data which shows that when 3 lb/T of a strength resin (Metrix®) was added to the paper, sizing performance decreased as indicated by higher Cobb values compared to paper that did not contain 3 lb/T of DSR.

Figure 10:
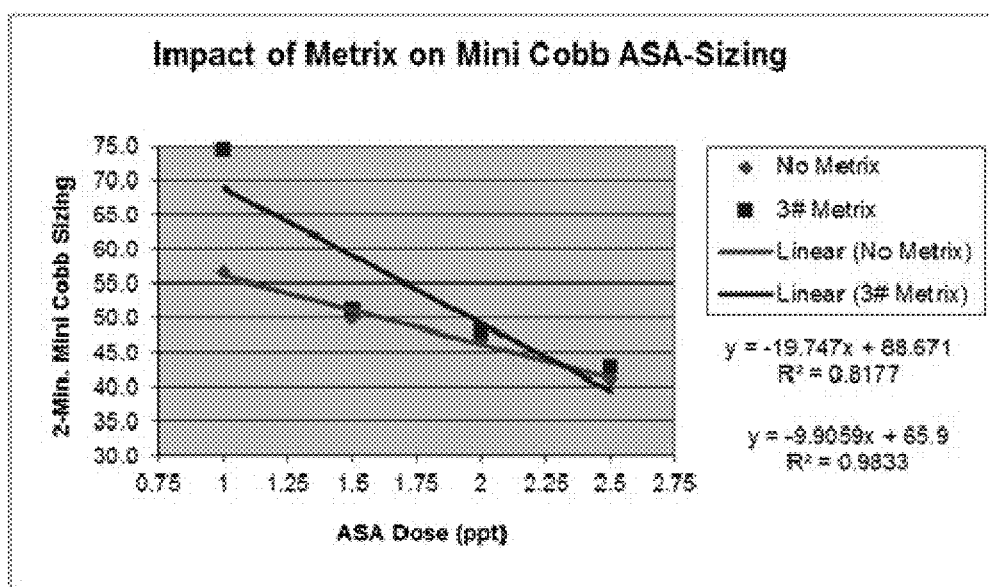

FIG. 10 shows lab sizing performance data which shows that when 3 lb/T of a strength resin (Metrix®) was added to the paper, sizing performance decreased as indicated by higher Cobb values compared to paper that did not contain 3 lb/T of DSR. Cobb values are similar at higher size dosages, which can be a common occurrence depending on parameters of Cobb test method.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A sizing emulsion, comprising:
    a) a sizing agent selected from the group consisting of an alkyl ketene dimer ("AKD") and an alkenyl succinic anhydride (ASA);
    b) an emulsifier selected from the group consisting of:
    glyoxalated poly(DADMAC)/AcAm polymer having a 5 mole % DADMAC monomer content;
    glyoxalated poly(DADMAC)/AcAm polymer having a 5 mole % DADMAC monomer content and further comprising $MgSO_4.7H_2O$;
    glyoxalated poly(DADMAC)/AcAm polymer having a 12 mole % DADMAC monomer content; and
    glyoxalated poly(DADMAC)/AcAm polymer having a 12 mole % DADMAC monomer content and further comprising $MgSO_4.7H_2O$; and
    c) an aqueous component.

2. The sizing emulsion of claim 1, wherein the emulsifier is glyoxalated poly(DADMAC)/AcAm polymer having a 5 mole % DADMAC monomer content.

3. The sizing emulsion of claim 1, wherein the emulsifier is glyoxalated poly(DADMAC)/AcAm polymer having a 5 mole % DADMAC monomer content and further comprising $MgSO_4.7H_2O$.

4. The sizing emulsion of claim 1, wherein the emulsifier is glyoxalated poly(DADMAC)/AcAm polymer having a 12 mole % DADMAC monomer content.

5. The sizing emulsion of claim 1, wherein the emulsifier is glyoxalated poly(DADMAC)/AcAm polymer having a 12 mole % DADMAC monomer content and further comprising $MgSO_4.7H_2O$.

6. The sizing emulsion of claim 1, having a median particle size of less than or equal to 2.5 microns.

7. The sizing emulsion of claim 1, having a median particle size of less than or equal to 2.0 microns.

8. The sizing emulsion of claim 1, having a median particle size of less than or equal to 1.5 microns.

9. The sizing emulsion of claim 1, having a median particle size of less than or equal to 1.4 microns.

10. The sizing emulsion of claim 1, having a median particle size of less than or equal to 1.3 microns.

11. The sizing emulsion of claim 1, having a median particle size of less than or equal to 1.5 microns after 0 minutes of aging, less than or equal to 1.5 microns after 30 minutes of aging, and less than or equal to 1.5 microns after 60 minutes of aging.

12. The sizing emulsion of claim 1, wherein the ratio of emulsifier to sizing agent ranges from 0.6:1.0 to 1.25:1.0, based on volume.

13. A method of enhancing sizing, the method comprising adding an effective amount of a sizing emulsion to a paper machine in a papermaking process, wherein the sizing emulsion comprises:
   a) a sizing agent selected from the group consisting of an alkyl ketene dimer ("AKD") and an alkenyl succinic anhydride (ASA);
   b) an emulsifier selected from the group consisting of:
   glyoxalated poly(DADMAC)/AcAm polymer having a 5 mole % DADMAC monomer content;
   glyoxalated poly(DADMAC)/AcAm polymer having a 5 mole % DADMAC monomer content and further comprising $MgSO_4 \cdot 7H_2O$;
   glyoxalated poly(DADMAC)/AcAm polymer having a 12 mole % DADMAC monomer content; and
   glyoxalated poly(DADMAC)/AcAm polymer having a 12 mole % DADMAC monomer content and further comprising $MgSO_4 \cdot 7H_2O$; and
   c) an aqueous component.

14. The method of claim 13, wherein the sizing emulsion is prepared in a high shear homogenizer emulsification unit and the volume ratio of emulsifier to ASA ranges from 0.6:1.0 to 1.0:1.0.

15. The method of claim 14, wherein the high shear homogenizer emulsification unit comprises a turbine loop, and the percentage of the emulsifier in the turbine loop ranges from 0.3% to 0.9% based on solids.

16. The method of claim 15, wherein the sizing emulsion has a median particle size ($D_{50}$) of 1.1 micron or less.

17. The method of claim 13, wherein the sizing emulsion is prepared in a high pressure turbine emulsification unit and the volume ratio of emulsifier to ASA ranges from 0.6:1.0 to 1.25:1.0.

18. The method of claim 17, wherein the high pressure turbine emulsification unit comprises a turbine loop, and the percentage of the emulsifier in the turbine loop ranges from 0.6% to 1.8% based on solids.

19. The method of claim 18, wherein the sizing emulsion has a median particle size ($D_{50}$) of 1.3 micron or less.

20. The method of claim 13, wherein the sizing emulsion is diluted with a secondary carrier solution prior to entering a headbox of the paper machine.

21. The method of claim 20, wherein the secondary carrier solution is an aqueous solution comprising an emulsifier selected from the group consisting of:
   glyoxalated poly(DADMAC)/AcAm polymer having a 5 mole % DADMAC monomer content;
   glyoxalated poly(DADMAC)/AcAm polymer having a 5 mole % DADMAC monomer content and further comprising $MgSO_4 \cdot 7H_2O$;
   glyoxalated poly(DADMAC)/AcAm polymer having a 12 mole % DADMAC monomer content; and
   glyoxalated poly(DADMAC)/AcAm polymer having a 12 mole % DADMAC monomer content and further comprising $MgSO_4 \cdot 7H_2O$.

22. The method of claim 21, wherein the secondary carrier solution comprises about 2 weight % to about 10 weight % of the emulsifier.

23. The method of claim 20, wherein the secondary carrier solution is an aqueous solution free of emulsifiers.

24. The method of claim 20, wherein the ratio of secondary carrier solution added to the sizing emulsion ranges from 2:1 to 20:1.

25. An emulsion comprising:
   a) a sizing agent;
   b) a glyoxalated poly(DADMAC)/AcAm polymer; and
   c) an aqueous component.

26. The emulsion of claim 25, wherein the glyoxalated poly(DADMAC)/AcAm polymer is derived from a poly (DADMAC)/AcAm copolymer comprising 1 to 50 percent DADMAC monomer content.

27. The emulsion of claim 26, wherein the glyoxalated poly(DADMAC)/AcAm polymer is formed by reacting the poly(DADMAC)/AcAm copolymer with glyoxal in a molar ratio of about 0.05 to about 1.5, respectively.

28. The emulsion of claim 25, wherein the sizing agent is alkenyl succinic anhydride (ASA).

29. The emulsion of claim 25, having a median particle size of less than or equal to about 2.5 microns.

* * * * *